(12) United States Patent
Grosse et al.

(10) Patent No.: US 10,710,803 B2
(45) Date of Patent: Jul. 14, 2020

(54) METHOD FOR TRANSFERRING PART-LOAD CONSIGNMENTS TO A STORAGE RACK FOR STORAGE, AND STORAGE SYSTEM

(71) Applicant: TGW Mechanics GmbH, Wels (AT)

(72) Inventors: Eric Grosse, Langen (DE); Dieter Haslinger, Leonding (AT); Martin Rausch, Gmunden (AT)

(73) Assignee: TGW Mechanics GmbH, Wels (AT)

(*) Notice: Subject to any disclaimer, the term of this patent is extended or adjusted under 35 U.S.C. 154(b) by 143 days.

(21) Appl. No.: 15/568,053

(22) PCT Filed: Apr. 21, 2016

(86) PCT No.: PCT/AT2016/050106
§ 371 (c)(1),
(2) Date: Jan. 9, 2018

(87) PCT Pub. No.: WO2016/168878
PCT Pub. Date: Oct. 27, 2016

(65) Prior Publication Data
US 2018/0134488 A1    May 17, 2018

(30) Foreign Application Priority Data
Apr. 22, 2015  (AT) .............................. A 50321/2015

(51) Int. Cl.
*B65G 1/04* (2006.01)
(52) U.S. Cl.
CPC .................................. *B65G 1/0435* (2013.01)
(58) Field of Classification Search
CPC ........................... B65G 1/0407; B65G 1/0435
See application file for complete search history.

(56) References Cited

U.S. PATENT DOCUMENTS 5,615,992 A * 4/1997 Proske ................. B65G 1/0407
414/807
5,839,872 A   11/1998 Goto et al.
(Continued)

FOREIGN PATENT DOCUMENTS

AT            7107 U1    10/2004
DE   10 2009 032 406 A1    1/2011
(Continued)

OTHER PUBLICATIONS

International Search Report of PCT/AT2016/050106, dated Jul. 28, 2016.
(Continued)

*Primary Examiner* — Saul Rodriguez
*Assistant Examiner* — Willie Berry, Jr.
(74) *Attorney, Agent, or Firm* — Collard & Roe, P.C.

(57) ABSTRACT

A method transfers unit loads to storage channels for storage by conveying the unit loads to the storage channels using a unit load receiving device movable along the storage channels in an x-direction and a transporter extendable into the storage channel in a z-direction. The transporter includes outer transport elements in opposite end sections and optionally an in-between inner transport element. The unit load is moved from the unit load receiving device into the storage channel up to an intermediate position using one transport element by moving the transporter in a first direction. The transporter is then moved to a second direction to position the other transport element behind a unit load side wall facing the unit load receiving device. The unit load is finally shifted in the storage channel from the intermediate to the second depth position using the other transport element by moving the transporter.

12 Claims, 23 Drawing Sheets

(56) References Cited

U.S. PATENT DOCUMENTS

Figure 1:
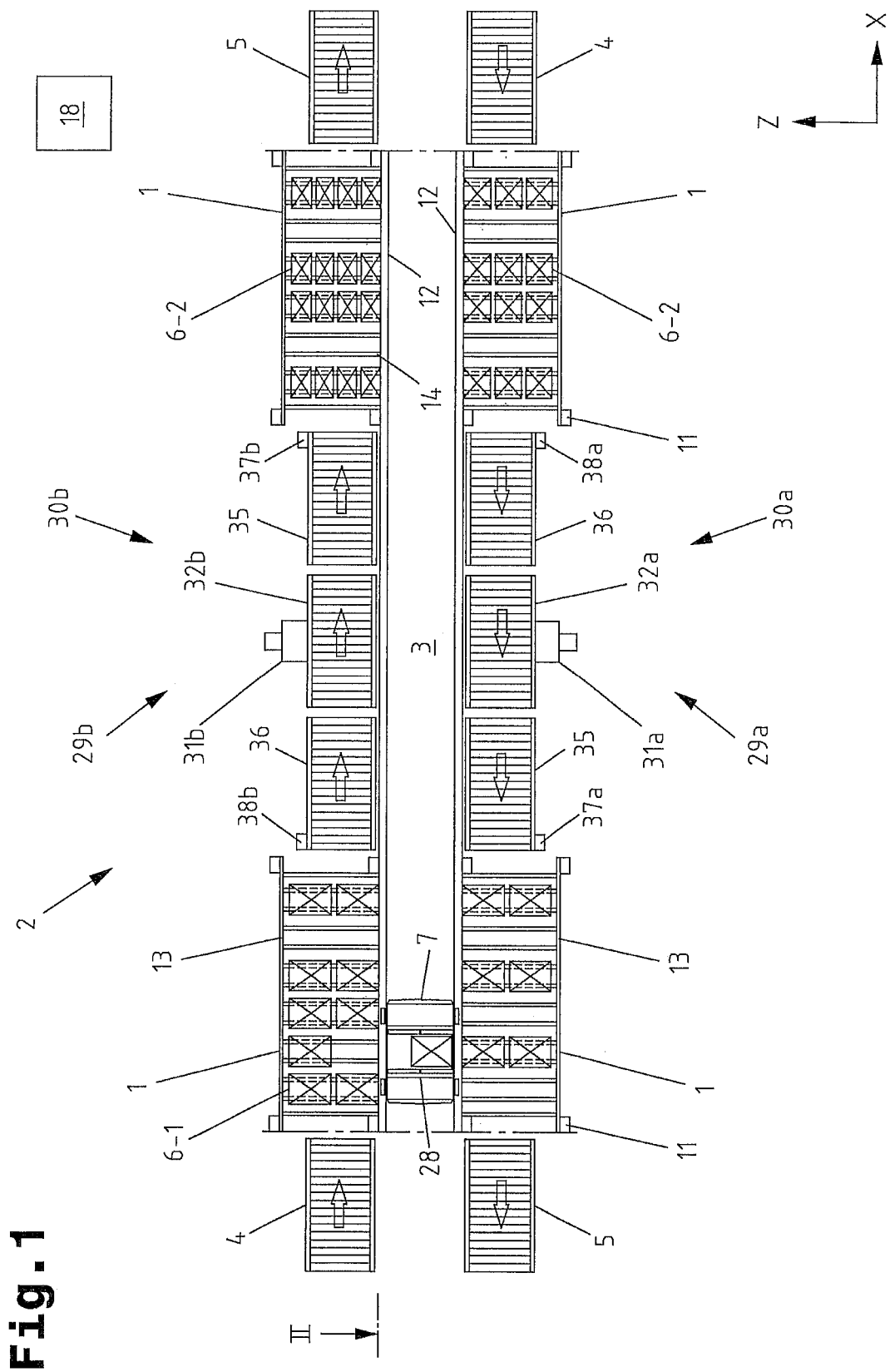

| | | | |
|---|---|---|---|
| 5,927,926 A * | 7/1999 | Yagi | B65G 1/0435 |
| | | | 414/274 |
| 6,923,622 B1 | 8/2005 | Dehlsen | |
| 8,594,835 B2 | 11/2013 | Lert et al. | |
| 8,740,542 B2 | 6/2014 | Wolkerstorfer | |
| 8,790,061 B2 | 7/2014 | Yamashita | |
| 9,452,886 B2 | 9/2016 | Yamashita | |
| 9,598,236 B2 | 3/2017 | Nakamura | |
| 2003/0185656 A1 | 10/2003 | Hansl | |
| 2011/0008138 A1 | 1/2011 | Yamashita | |
| 2014/0205423 A1 | 7/2014 | Yamashita | |
| 2015/0210472 A1 | 7/2015 | Nakamura | |
| 2015/0217935 A1 | 8/2015 | Nakamura | |
| 2015/0321845 A1 | 11/2015 | Nakamura | |
| 2015/0336741 A1 | 11/2015 | Ahammer et al. | |

FOREIGN PATENT DOCUMENTS

| | | |
|---|---|---|
| DE | 10 2012 107 176 A1 | 2/2014 |
| DE | 10 2012 017 985 A1 | 4/2014 |
| EP | 0 733 563 A1 | 9/1996 |
| EP | 2 234 904 B1 | 8/2011 |
| EP | 2 419 365 B1 | 2/2012 |
| EP | 2 433 882 A1 | 3/2012 |
| EP | 2 433 882 B1 | 5/2013 |
| EP | 2 351 698 B1 | 8/2014 |
| JP | 9-48507 A | 2/1997 |
| JP | 2003-048604 A | 2/2003 |
| JP | 5775971 B2 | 9/2015 |
| WO | 2010/090515 A1 | 8/2010 |
| WO | 2012/044734 A1 | 4/2012 |
| WO | 2012/106744 A1 | 8/2012 |
| WO | 2012/106745 A1 | 8/2012 |
| WO | 2013/090958 A1 | 6/2013 |
| WO | 2013/090970 A2 | 6/2013 |
| WO | 2014/023539 A1 | 2/2014 |
| WO | 2014/038308 A1 | 3/2014 |
| WO | 2014/038309 A1 | 3/2014 |

OTHER PUBLICATIONS https://www.youtube.com/watch?v=64jSG3gpe0M—O2 (submitted Aug. 2019).
https://www.youtube.com/watch?v=DQq_S4RoSKM—O3 (submitted Aug. 2019).
https://www.youtube.com/watch?v=7eAUoYmtzVA—Gebhardt StoreBiter OLS (submitted Aug. 2019).
D10 Statement Under Oath by Sebastian Ahl, Jul. 30, 2019.
D11 Screenshots_o1a, 01-2-2: 0:00:16 (13 pages) (submitted Aug. 2019).
D12 CAD Plan logimat_o1a, Feb. 2012 (2 pages).
D13 LogiMAT 2012 Halle_Hall 1 EG_O1b, Mar. 2012 (1 page).
D14 Logimat 2012 Standbaugenehmigung_Stand Construction Approval_O1c, Feb. 2012 (3 pages).
D15 LogiMAT2012 Dematic_O1d, Mar. 2012 (4 pages).
D16 E-Mail zu Logimat 2012_O0e, Feb. 2012 (2 pages).
D22 Entwurf_Draft_OVB1, Jul. 2013 (1 page).
D23 Ablaufbeschreibung_Procedure Description_OVB2, Jul. 2013 (1 page).
D24 Schwingshandl Rechnung Juli_Invoice_OVB3, Jul. 2013 (5 pages).
D25 Schwingshandl Rechnung August_Invoice_OVB4, Aug. 2013 (4 pages).
D26 Wöchentliches Statusmonitoring_Weekly status monitoring_OVB6, 2014 (30 pages).
O1.2.1 '53 (2012).
O1.3'56 (2012).
O1.2.2 Cap0316_004(0026) (submitted Aug. 2019).
O1.2.3 Cap0316_004(0028) (submitted Aug. 2019).
OBV5 Cuby (2014).

* cited by examiner

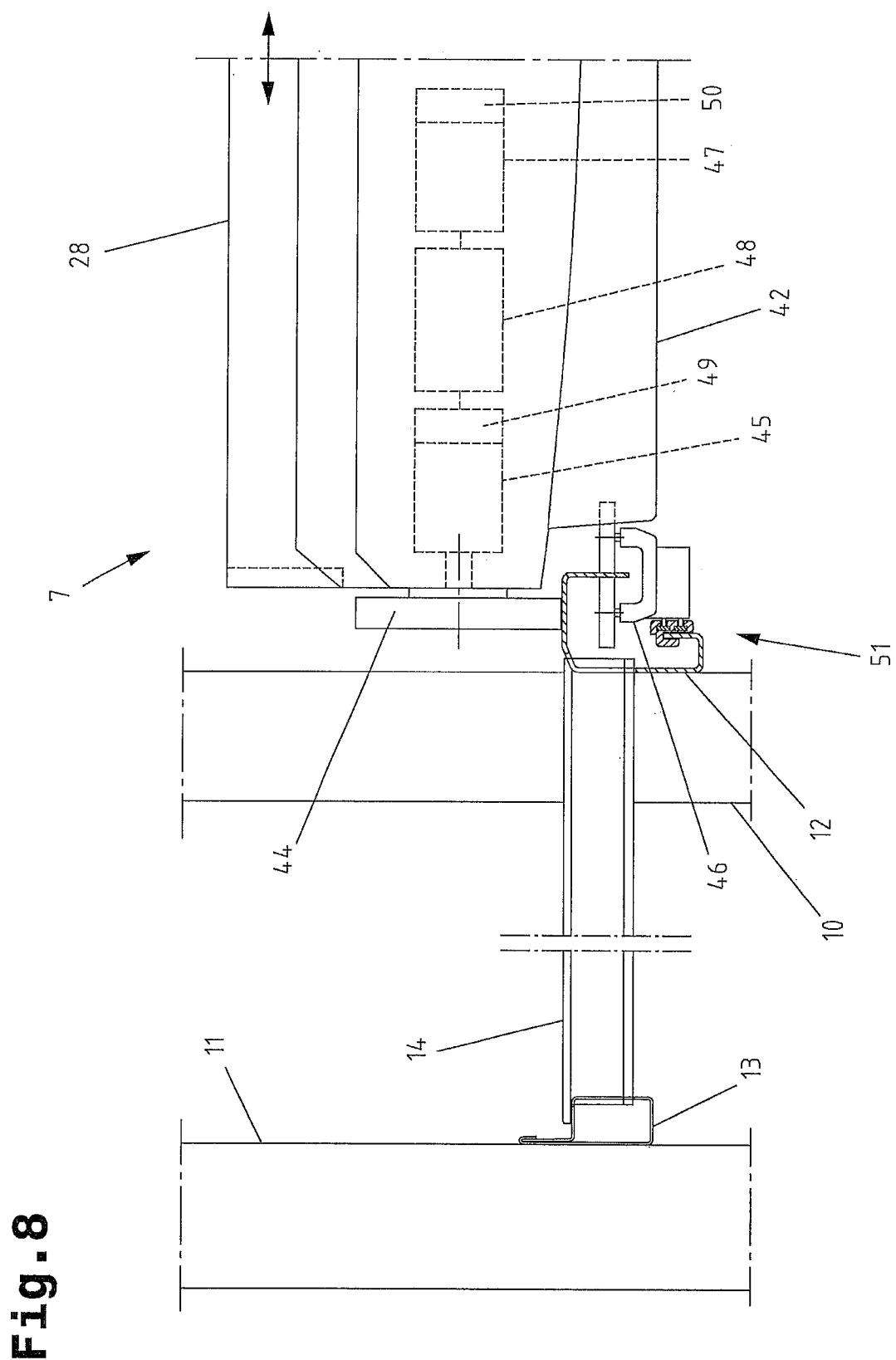

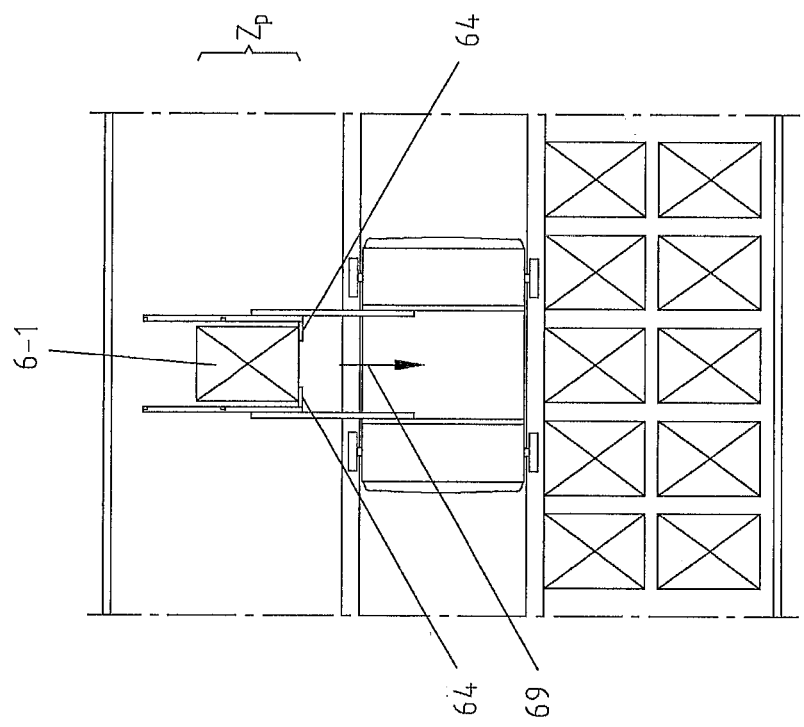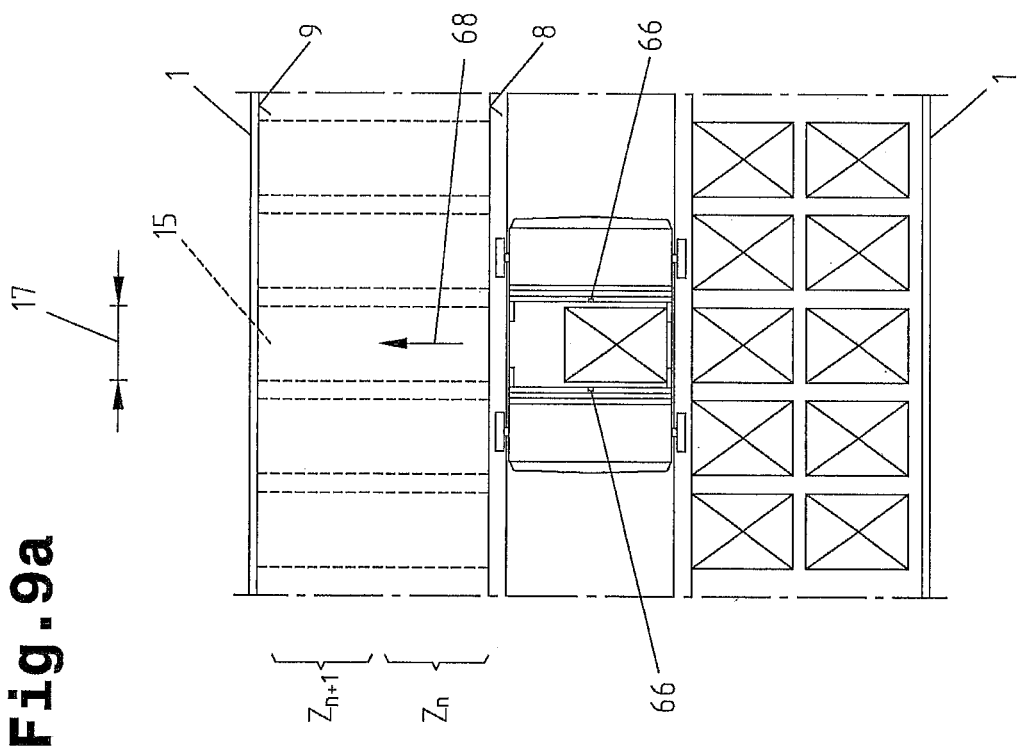

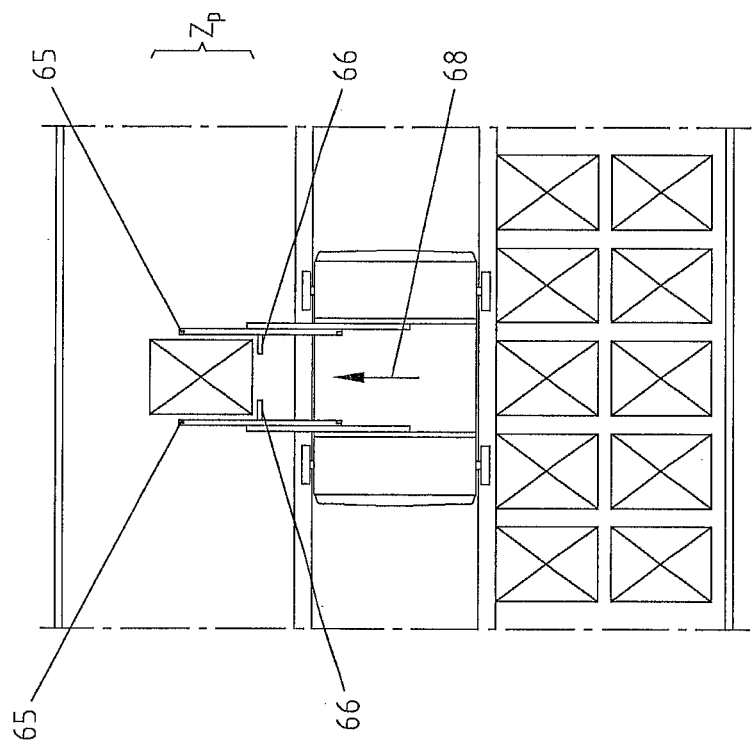
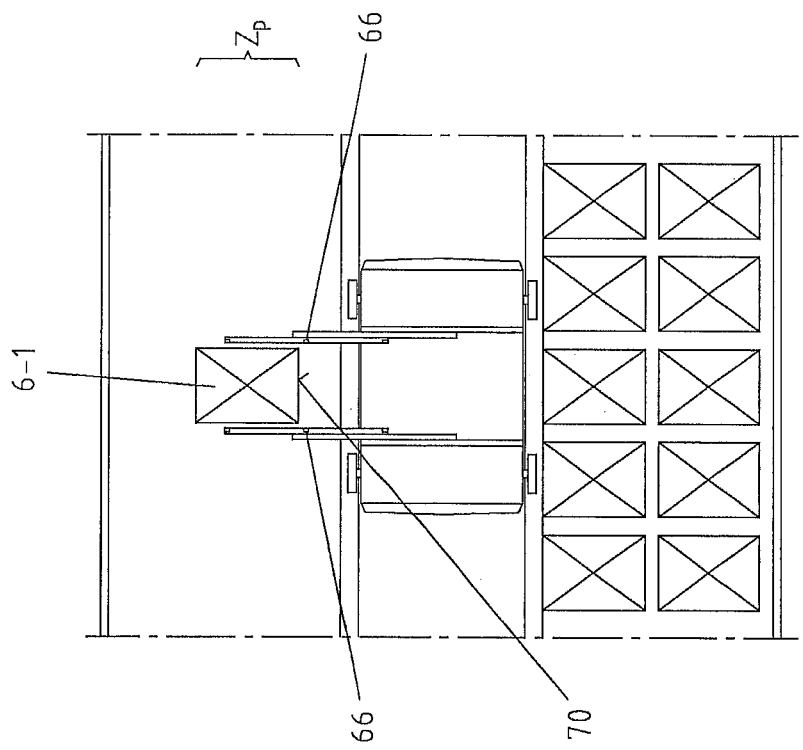

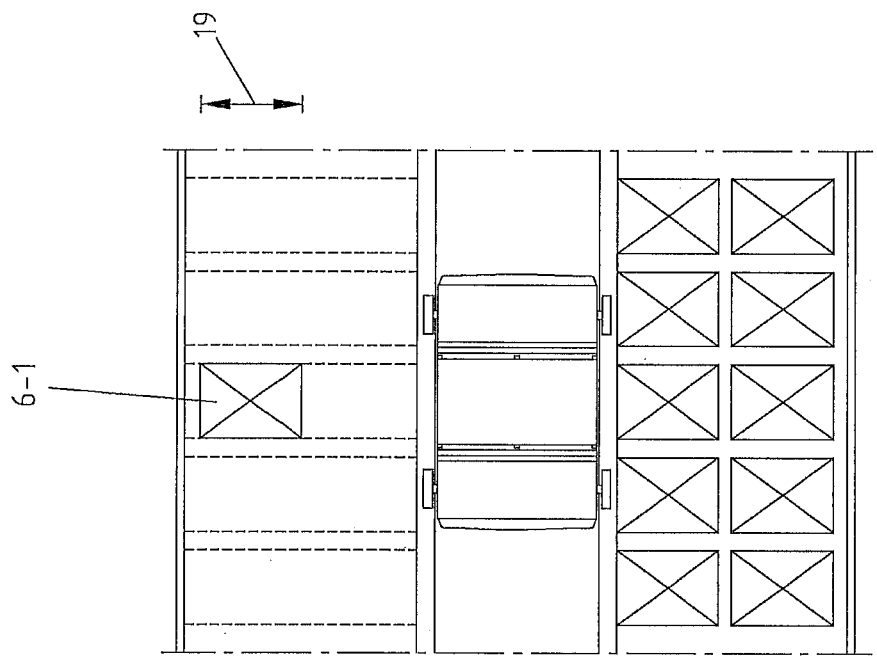
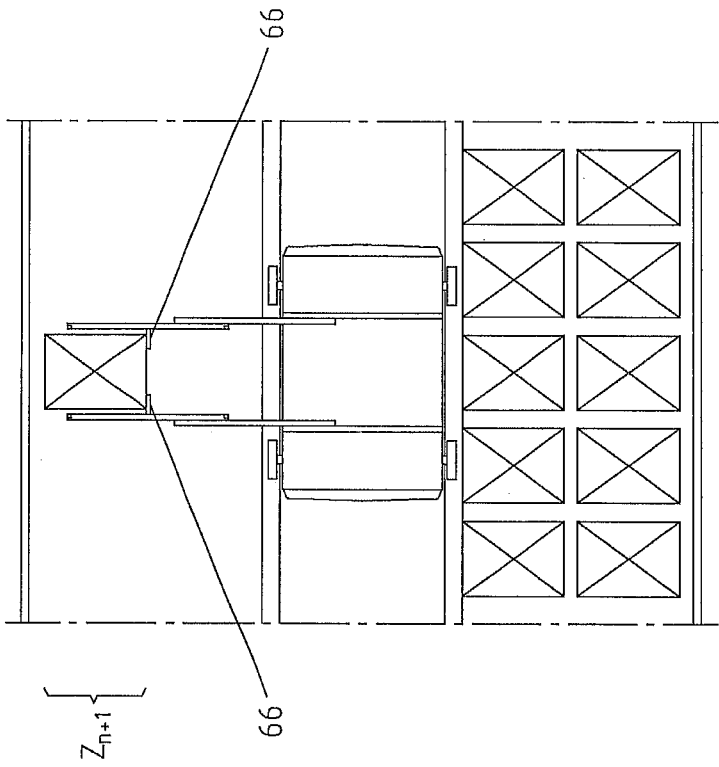

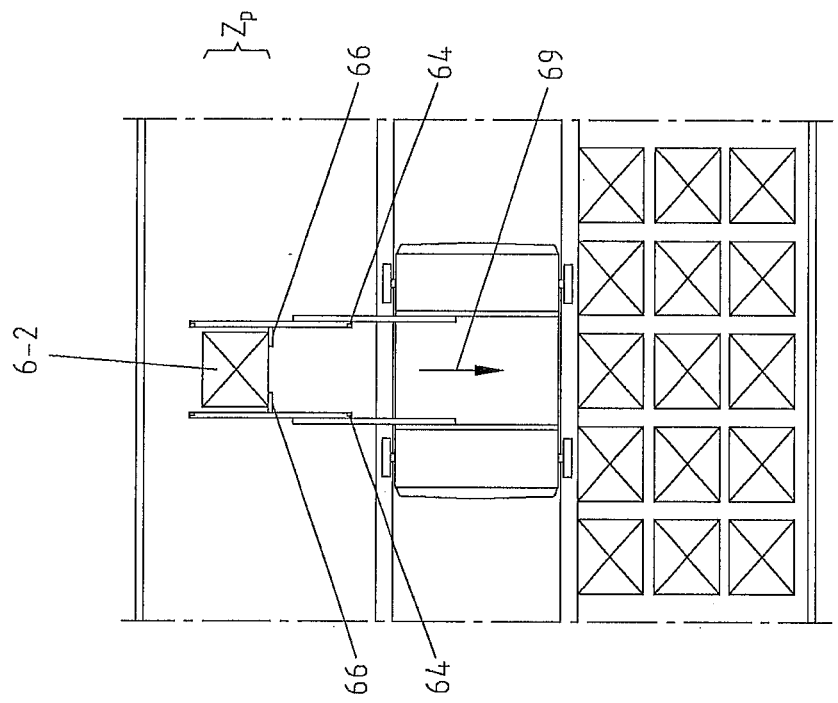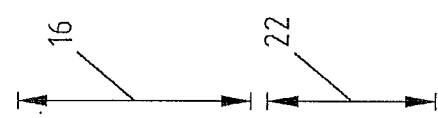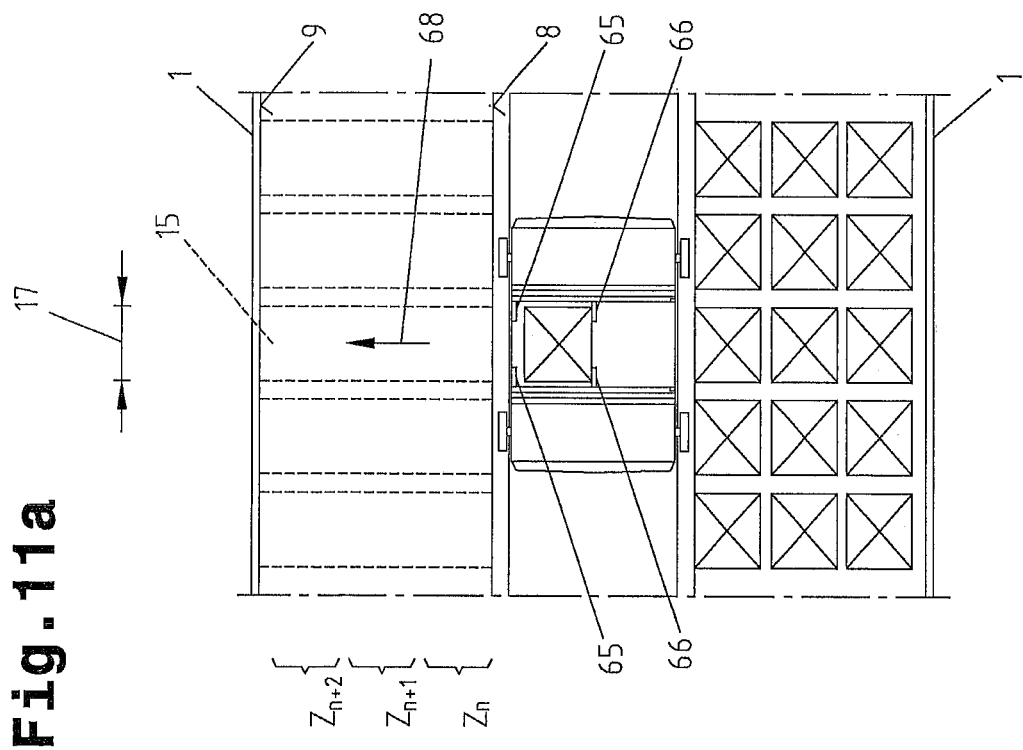

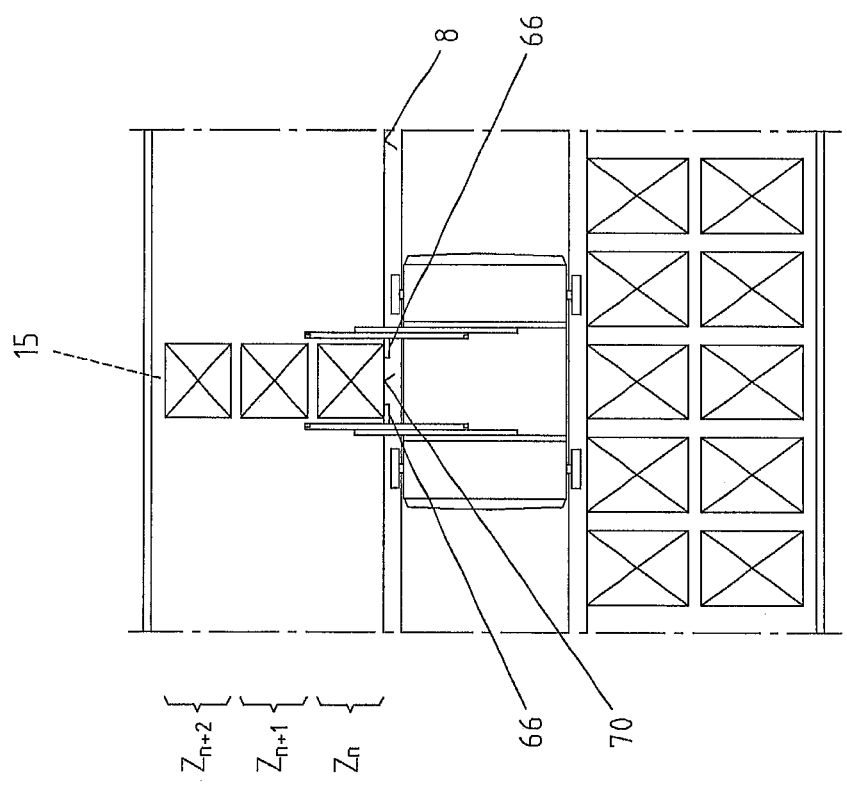

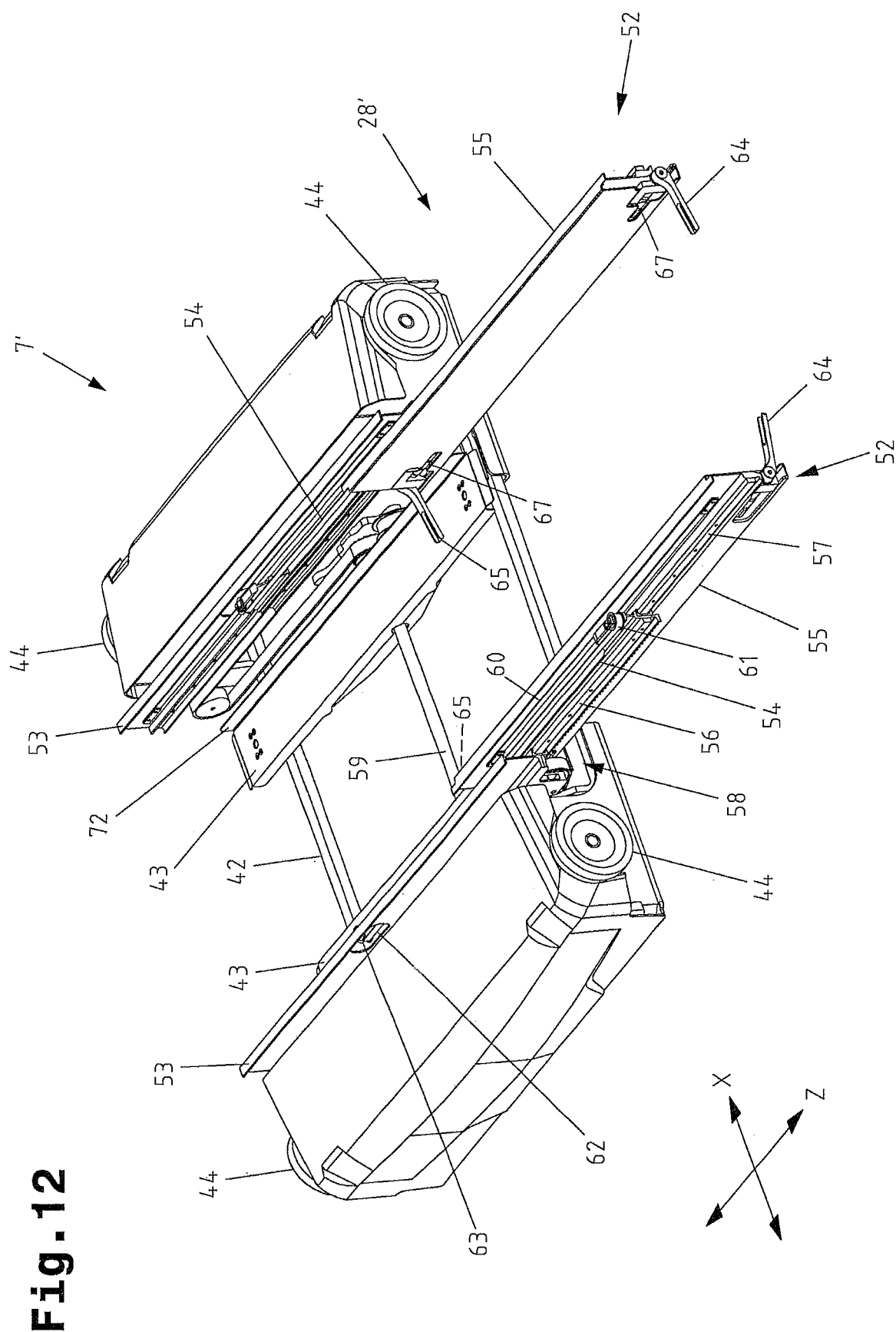

METHOD FOR TRANSFERRING PART-LOAD CONSIGNMENTS TO A STORAGE RACK FOR STORAGE, AND STORAGE SYSTEM

CROSS REFERENCE TO RELATED APPLICATIONS

This application is the National Stage of PCT/AT2016/050106 filed on Apr. 21, 2016, which claims priority under 35 U.S.C. § 119 of Austrian Application No. A 50321/2015 filed on Apr. 22, 2015, the disclosure of which is incorporated by reference. The international application under PCT article 21(2) was not published in English.

The invention relates to a method for transferring (storing) unit loads to storage channels of a storage rack having a plurality of storage channels, whereby the unit loads are conveyed to the storage channels by means of a unit load receiving device which can be moved along the storage rack in a first direction (x-direction) and into the storage channels by means of a transport device which can be extended out from the unit load receiving device into the storage channel in a second direction (z-direction), and the transport device is equipped with either exclusively at least one outer transport element respectively in opposite end sections or with at least one outer transport element respectively in opposite end sections and at least one inner transport element in between them in order to transfer the unit loads to depth positions lying one behind the other at a mutual distance in at least one of the storage channels. If the transport device is provided exclusively with at least one outer transport element respectively in opposite end sections, the unit load receiving device is able to receive a unit load (of substantially any length dimension) between the outer transport elements. If the transport device is also provided with at least one inner transport element, the unit load receiving device may either receive a unit load of a first length dimension exclusively between the outer transport elements or at least one unit load of a second length dimension between one of the outer transport elements and the inner transport element. The invention further relates to a storage system with at least one storage rack having a plurality of storage channels, a unit load receiving device and a transport device.

EP 2 234 904 A1 discloses a method for transferring unit loads by means of a transport device into a storage channel with setting-down locations arranged one behind the other for unit loads of uniform length and width dimensions. In this instance, a first unit load is conveyed by the transport device into the storage channel to the front storage space in the storage direction. A second unit load is then moved by the transport device into the storage channel to the front storage space so that the first unit load is moved in the storage direction to the storage space lying behind and the second unit load is moved to the front storage space so that the unit loads are set down in the storage channel one against the other in a tightly packed manner. The transport device has transport elements for the storage operation and transport elements for the retrieval operation.

A transport device for transferring unit loads into storage channels and/or retrieving unit loads from storage channels is also known from EP 2 351 698 B1. This known transport device is disposed on a unit load receiving device and is provided with an outer transport element respectively in opposite end sections and inner transport elements disposed between them. In this instance, a unit load having a first length dimension (600 mm×400 mm) is positioned on the unit load receiving device between one of the outer transport elements and either the first inner transport element or second inner transport element. The unit load having a first length dimension is thus moved into the storage channel to the final depth position by means of the outer transport element.

EP 2 433 882 A1 discloses a method for transferring unit loads into storage channels and/or retrieving unit loads from storage channels, whereby the unit loads are moved by means of a transport device which can be extended into a storage channel as a unit load group or individually one after the other from the unit load receiving device to depth positions disposed one behind the other in the longitudinal direction of the storage channel.

A transport device for transferring unit loads into storage channels and/or retrieving unit loads from storage channels disclosed in AT 7107 U1 comprises exclusively outer transport elements in opposite end sections.

Document US 2003/0185656 A1, on the other hand, discloses a transport device for transferring unit loads into storage channels and/or retrieving unit loads from storage channels which, in addition to the outer transport elements disposed in its oppositely lying end sections, also comprises inner transport elements.

A unit load receiving device having a transport device for transferring unit loads into storage channels and/or retrieving unit loads from storage channels is also known from EP 0 733 563 A1. The transport device essentially corresponds to that disclosed in EP 2 351 698 B1 in terms of design.

EP 2 393 735 A1 discloses a transport device for transferring unit loads, by means of which unit loads of different length and width dimensions can be manipulated. The storage channels have bottom plates with ribs, on the projecting ribs of which the unit loads can be deposited in different depth positions.

WO 2014/023539 A1 discloses a method for bringing unit loads from a storage rack together on an outbound track, whereby the unit loads are transferred into and retrieved from the storage rack by means of a transport device (storage and retrieval device) provided for each rack aisle. In this instance, unit loads can be switched directly between two adjoining storage racks from one rack aisle into a neighboring rack aisle via transverse conveyance locations in the storage racks and the transport device moves the unit loads into the transverse conveyance locations. To this end, the transport device comprises telescopic arms with displaceable drivers.

U.S. Pat. No. 8,594,835 B2 discloses an automatic storage system with storage racks having an array of storage channels and a plurality of unit load receiving devices (shuttles) for each rack level which can be moved along guide rails in a first direction (x-direction). The unit load receiving devices are each provided with a transport device which can be extended into the storage channel in a second direction (z-direction). The unit load receiving devices and transport devices are activated by a control unit. The storage channels are able to accommodate unit loads of different dimensions.

The underlying objective of the invention is to propose a method for storing unit loads and a storage system, whereby the ratio of spatial capacity to available storage capacity is optimized and a high storage efficiency is achieved.

The objective of the invention is achieved by means of the following method steps and features:

transferring a unit load (optionally of the first length dimension or optionally at least one unit load of a second length dimension) to the unit load receiving device, positioning the unit load receiving device in front of a storage channel designated by a control unit in which a unit load is to be stored at least in a first depth position ($Z_n$) and a unit load is to be stored in a second depth position ($Z_{n+1}$) lying behind it, initially shifting a unit load from the unit load receiving device into the storage channel such that this unit load is shifted by one of the transport elements by moving the transport device in the direction of the storage channel (first direction of adjustment) up to an intermediate position ($Z_P$), moving back the transport device in the direction of the unit load receiving device (second direction of adjustment) such that the other one of the transport elements that will be used to shift the unit load from the intermediate position ($Z_P$) to the second depth position ($Z_{n+1}$) is positioned behind a side wall of the unit load facing the unit load receiving device, finally shifting the unit load in the storage channel from the intermediate position ($Z_P$) to the second depth position ($Z_{n+1}$) by means of the other one of the transport elements by moving the transport device in the direction of the storage channel (first direction of adjustment).

In consecutive shifting movements, the unit load which is to be stored in the rear/rearmost depth position in the depth direction of the storage channel is then moved (shifted) from the unit load receiving device as far as the final depth position or storage position. Firstly, the unit load is moved and/or displaced to an intermediate position and only then from the latter into a second depth position (storage position). Firstly, this enables a multi-depth storage system of unit loads (either of the first length dimension or second length dimension) to be achieved using a unit load receiving device of a narrow design on the one hand, and secondly, the transport device, in particular the telescopic unit(s), is/are moved in the z-direction at most across the length of the storage depth of the storage channel even if a unit load is being stored at the rear/rearmost depth position. The transport device does not protrude beyond a rear longitudinal side of the storage rack. This being the case, a maximum extension movement or extension length of the transport device out from the unit load receiving device is shorter than the storage depth of the storage channel. Furthermore, the transport device may be based on a particularly simple design and in the simplest case, based on a first embodiment, may comprise just the outer transport elements and an inner transport element or, based on a second embodiment, just the outer transport elements. Nevertheless, it is still possible to move and store unit loads of differing length dimensions virtually without restriction. The unit load receiving device may be built to a slimmer design than unit load receiving devices known from the prior art and more of the available spatial capacity may be used as storage capacity. The backward movement of the transport device, in particular the telescopic unit(s), is calculated by the electronic control unit depending on the length dimension of the unit load that is to be moved from the intermediate position to the final (rear/rearmost) depth position and is shorter than the (possible) adjusting movement of the transport device to an initial position in which the transport device is positioned substantially centrally on the unit load receiving device. The transport device is preferably moved back to just short of the side wall so that the transport element(s) can be moved into the operating position without colliding with the unit load.

It has also proved to be of advantage if the following method steps are implemented:

transferring a first unit load of the first length (long unit loads) to the unit load receiving device, positioning the unit load receiving device in front of a storage channel designated by a control unit in which a unit load of the first length is to be stored at least in a first depth position ($Z_n$) and a unit load of the first length is to be stored in a second depth position ($Z_{+1}$) lying behind it, initially shifting the unit load from the unit load receiving device into the storage channel such that this unit load is shifted by the rear, outer transport element in its direction of adjustment by moving the transport device in the direction of the storage channel (first direction of adjustment) up to the intermediate position ($Z_P$), moving back the transport device in the direction of the unit load receiving device (second direction of adjustment) such that the inner transport element is positioned behind a side wall of the unit load facing the unit load receiving device, finally shifting the unit load in the storage channel from the intermediate position ($Z_P$) to the second depth position ($Z_{n+1}$) by means of the inner transport element by moving the transport device in the direction of the storage channel (first direction of adjustment).

In consecutive shifting movements, the unit load which is to be stored in the rear depth position in the depth direction of the storage channel is shifted from the unit load receiving device up to the final storage position. The unit load is guided by the transport device during the transfer movement between the unit load receiving device and the storage channel, thereby limiting any undesired skewing of the unit load. Unit loads having packaging of "inferior" quality can also be conveyed and transferred to the rear depth position sufficiently accurately to ensure that a subsequent retrieval operation can be reliably implemented.

The following method steps may also be advantageously implemented:

transferring a second unit load of the first length (long unit loads) to the unit load receiving device, positioning the unit load receiving device in front of the designated storage channel in which the first unit load of the first length has already been transferred to the second depth position ($Z_{n+1}$), shifting the second unit load in the direction of adjustment from the unit load receiving device into the storage channel to the first depth position ($Z_n$) by means of the rear, outer transport element by moving the transport device in the direction of the storage channel (first direction of adjustment).

The unit load which is to be stored in the front depth position in the depth direction of the storage channel is moved (shifted) in a single transfer movement from the unit load receiving device to the final storage position. Again as a result of this feature, the unit load which is to be stored in the front depth position in the depth direction of the storage channel is guided by means of the transport device during the transfer movement between the unit load receiving device and the storage channel, thereby limiting any undesired skewing of the unit load. Unit loads having packaging of "inferior" quality can also be conveyed and stored sufficiently accurately in the front depth position to ensure that a subsequent retrieval operation can be reliably implemented.

The following method steps have also proved to be of advantage:

transferring a first unit load of the second length (short unit load) to the unit load receiving device, positioning the unit load receiving device in front of a storage channel designated by a control unit in which a unit load of the second length is to be stored at least in a first depth position ($Z_n$) and a unit load of the second length is to be stored in a second depth position ($Z_{n+1}$) lying behind it and a unit load of the second length is to be stored in a third depth position ($Z_{n+2}$) lying behind it, initially shifting the unit load from the unit load receiving device into the storage channel such that this unit load is shifted by the inner transport element by moving the transport device in the direction of the storage channel (first direction of adjustment) up to the intermediate position ($Z_P$), moving back the transport device in the direction of the unit load receiving device (second direction of adjustment) such that the rear, outer transport element is positioned in the second direction of adjustment behind a side wall of the unit load facing the unit load receiving device, finally shifting the unit load in the storage channel from the intermediate position ($Z_P$) to the third depth position ($Z_{n+2}$) by means of the front, outer transport element in the first direction of adjustment by moving the transport device in the direction of the storage channel (first direction of adjustment).

The (third or fourth, etc.) unit load which is to be stored in the rearmost depth position in the depth direction of the storage channel is moved (shifted) in consecutive adjusting movements from the unit load receiving device up to the final storage position. It has also proved to be of advantage if the unit loads of the second length are each moved (shifted) individually from the unit load receiving device into the storage channel even if the unit load receiving device is capable of receiving more than one unit load of the second length because this approach enables the spaces between the unit loads deposited in the depth positions lying one after the other to be reduced to a minimum.

The following method steps are also of advantage:

transferring a second unit load of the second length (short unit load) to the unit load receiving device, positioning the unit load receiving device in front of the designated storage channel in which the first unit load of the second length has already been transferred to the third depth position ($Z_{n+2}$), shifting the second unit load from the unit load receiving device in the storage channel in the direction of adjustment to the second depth position ($Z_{n+1}$) by means of the rear, outer transport element or by means of the middle transport element by moving the transport device in the direction of the storage channel (first direction of adjustment), and then transferring a third unit load of the second length to the unit load receiving device, positioning the unit load receiving device in front of the designated storage channel in which the first unit load of the second length has already been transferred to the third depth position ($Z_{n+2}$) and the second unit load of the second length has already been transferred to the second depth position ($Z_{+1}$), shifting the third unit load from the unit load receiving device in the storage channel in the direction of adjustment to the first depth position ($Z_n$) by means of the rear, outer transport element or by means of the middle transport element by moving the transport device in the direction of the storage channel (first direction of adjustment).

Whilst the (third or fourth etc.) unit load is being moved (shifted) in consecutive adjusting movements from the unit load receiving device up to the final storage position as described above, those unit loads which are to be stored in the depth positions lying in front in the depth direction of the storage channel are moved (shifted) by a single transfer movement from the unit load receiving device up to the final storage positions in each case.

One particularly advantageous feature has proved to be the fact that the unit load receiving device comprises a support frame, the transport device mounted on the support frame and a receiving platform, and the receiving platform is configured to transport a single unit load of the first length (long unit load) or at least one unit load of the second length (short unit load), and the transport device has (synchronously extendable) telescopic units disposed parallel with longitudinal sides of the receiving platform, and the telescopic units respectively have a base frame, a first rail that is displaceable relative to the base frame and a second rail that is displaceable relative to the first rail, and the second rail is provided with the outer transport element at its mutually opposite end sections respectively and the inner transport element disposed in between, and the transport elements can be moved between an initial position retracted away from the unit load and an operating position engaging with the unit load.

The transport device is characterized by its compact design and enables the unit loads to be transported horizontally between the unit load receiving device and a storage channel. The unit loads can be transferred to the storage channel and unit loads retrieved from the storage channel very dynamically. The unit loads can also be handled gently as they are transported.

Based on one advantageous embodiment of the invention, the unit load receiving device is provided in the form of a single-level storage and retrieval unit.

Based on one embodiment of the invention, the storage system comprises:

a first storage rack having storage channels disposed adjacent to one another in rack levels lying one above the other, a second storage rack having storage channels disposed adjacent to one another in rack levels lying one above the other, a rack aisle which extends in the x-direction between the first storage rack and second storage rack, a plurality of unit load receiving devices, each unit load receiving device having a transport device which can be extended out from this unit load receiving device into the storage channel in a second direction (z-direction), and the control unit activates the unit load receiving devices and transport devices in order to transfer the unit loads to depth positions ($Z_n \ldots Z_{n+2}$) lying one behind the other in the storage channels with a mutual spacing, a unit load handling device comprising at least one unit load lifting device having a transport device which can be raised and lowered for transferring and/or retrieving unit loads and a buffer device with waiting devices for temporarily buffering unit loads, guide rails which are disposed in at least some of the rack levels between the first storage rack and second storage rack in such a way that the unit load receiving devices are able to move alongside the storage channels and waiting devices in order to transport unit loads between the storage channels and waiting devices, a conveyor system connected to the unit load lifting device for conveying unit loads to and/or from the unit load lifting device.

Particularly high storage and retrieval rates can be achieved with such a storage system. During retrieval operations, the transport device is able to access a large range of unit loads having different length dimensions or unit loads having the same length dimensions on a random basis.

Based on one advantageous embodiment of the invention, prior to being moved from the unit load receiving device into the storage channel, the unit load can be aligned on the unit load receiving device in a direction extending transversely to the longitudinal extension of the storage channel. This ensures that the unit load can be aligned in readiness on the unit load receiving device with a high degree of positioning accuracy and moved from the unit load receiving device into the intermediate position and final depth position and/or storage position without becoming skewed, even if the unit load is guided exclusively by the outer transport elements. The aligning operation may be implemented either by means of the transport device or by separate centering bars. It would also be conceivable for the outer transport elements to be disposed at a distance from the mutually opposite end sections respectively of the transport device so that a length of the transport device is longer than a distance between the outer transport elements. As a result, the unit load is guided not just by the outer transport element(s) during the transfer movement but is also guided by the transport device.

It may also be of advantage if, prior to being moved from the unit load receiving device into the storage channel, the unit load is positioned on the unit load receiving device in a direction parallel with the longitudinal extension of the storage channel. The unit load is positioned on the unit load receiving device parallel with the z-direction by means of a motorized conveyor device co-operating with the receiving platform or by means of the transport device.

To provide a clearer understanding, the invention will be described in more detail below with reference to the appended drawings.

Figure 2:
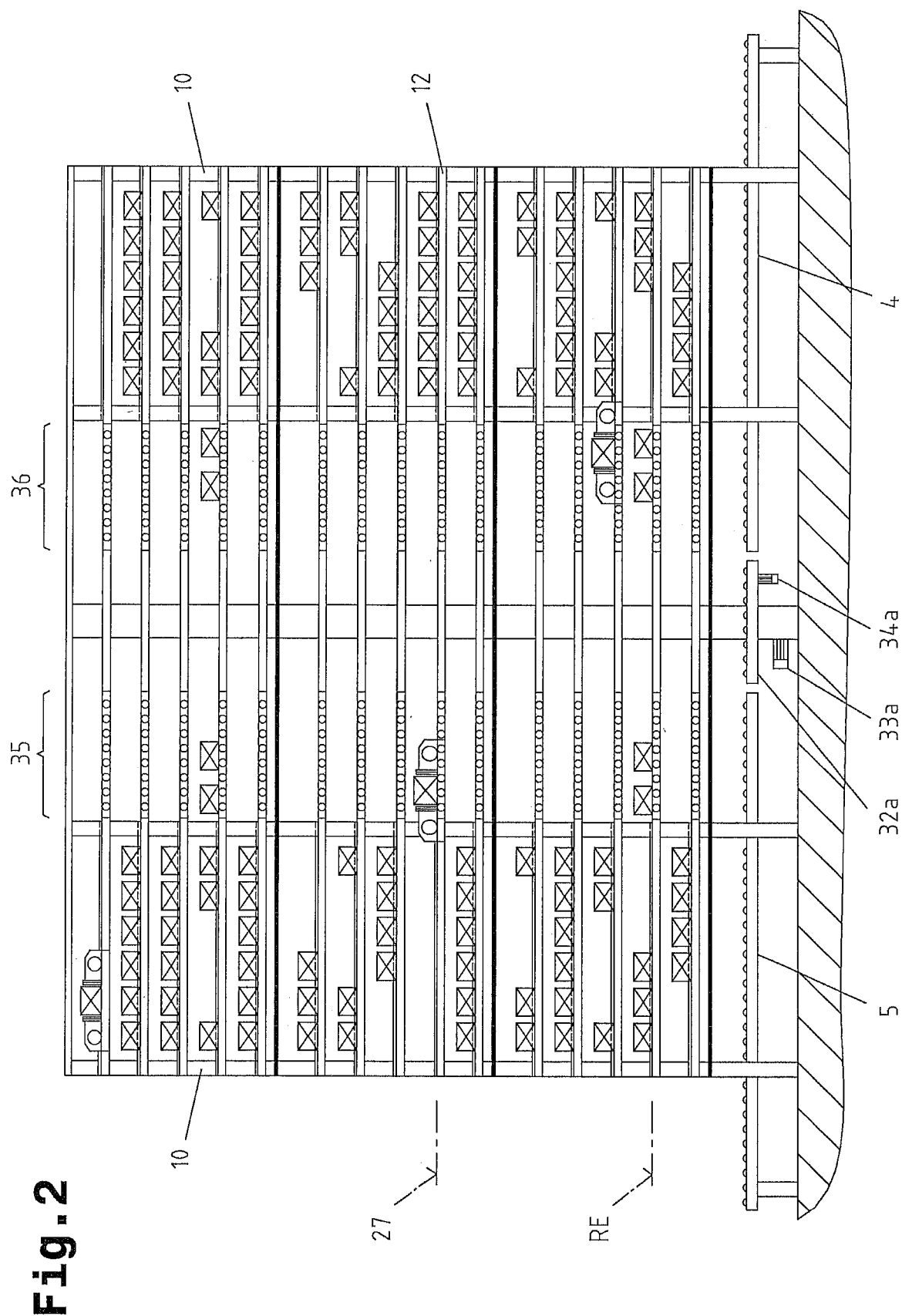
Figure 3:
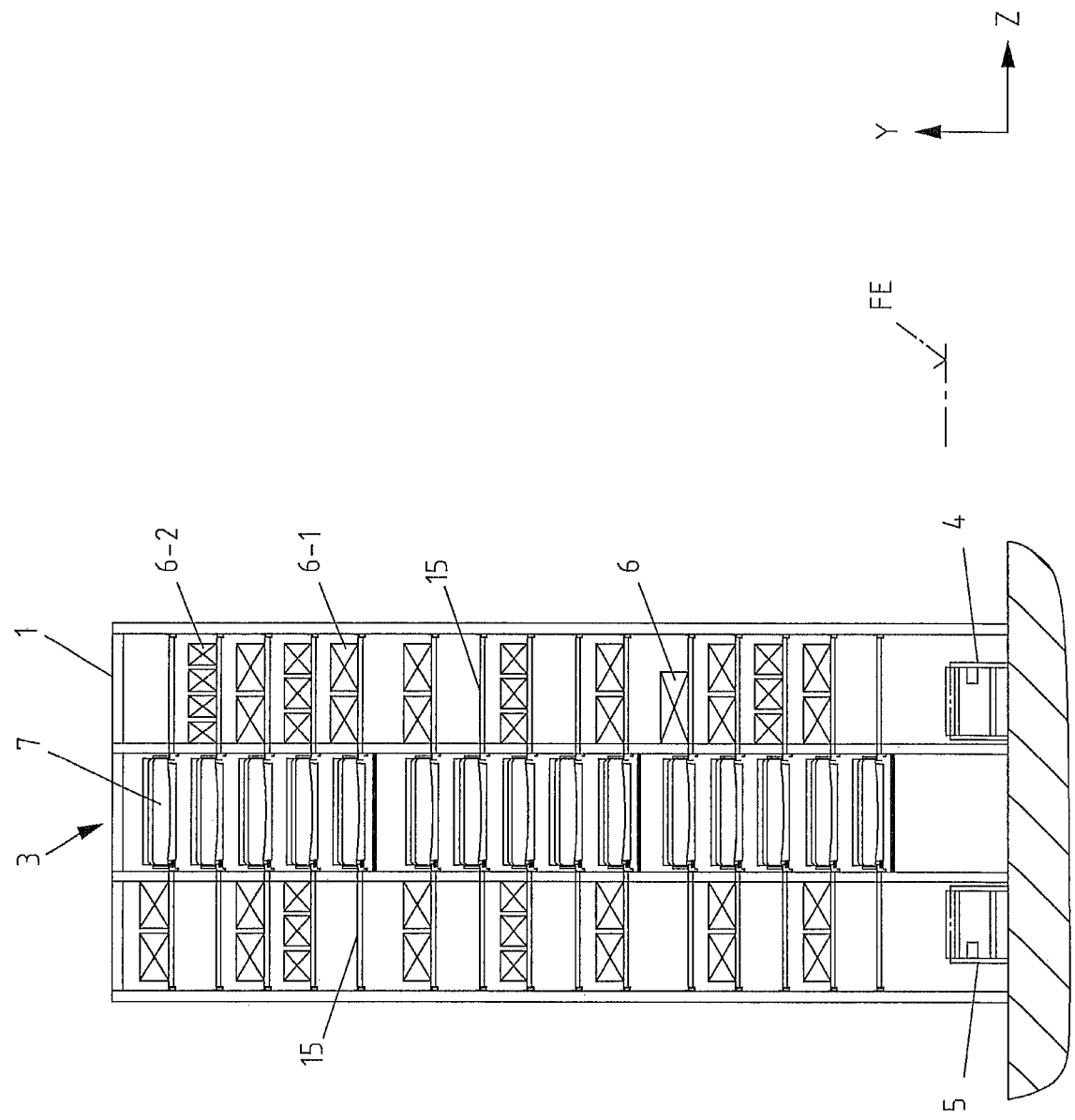
Figure 4:
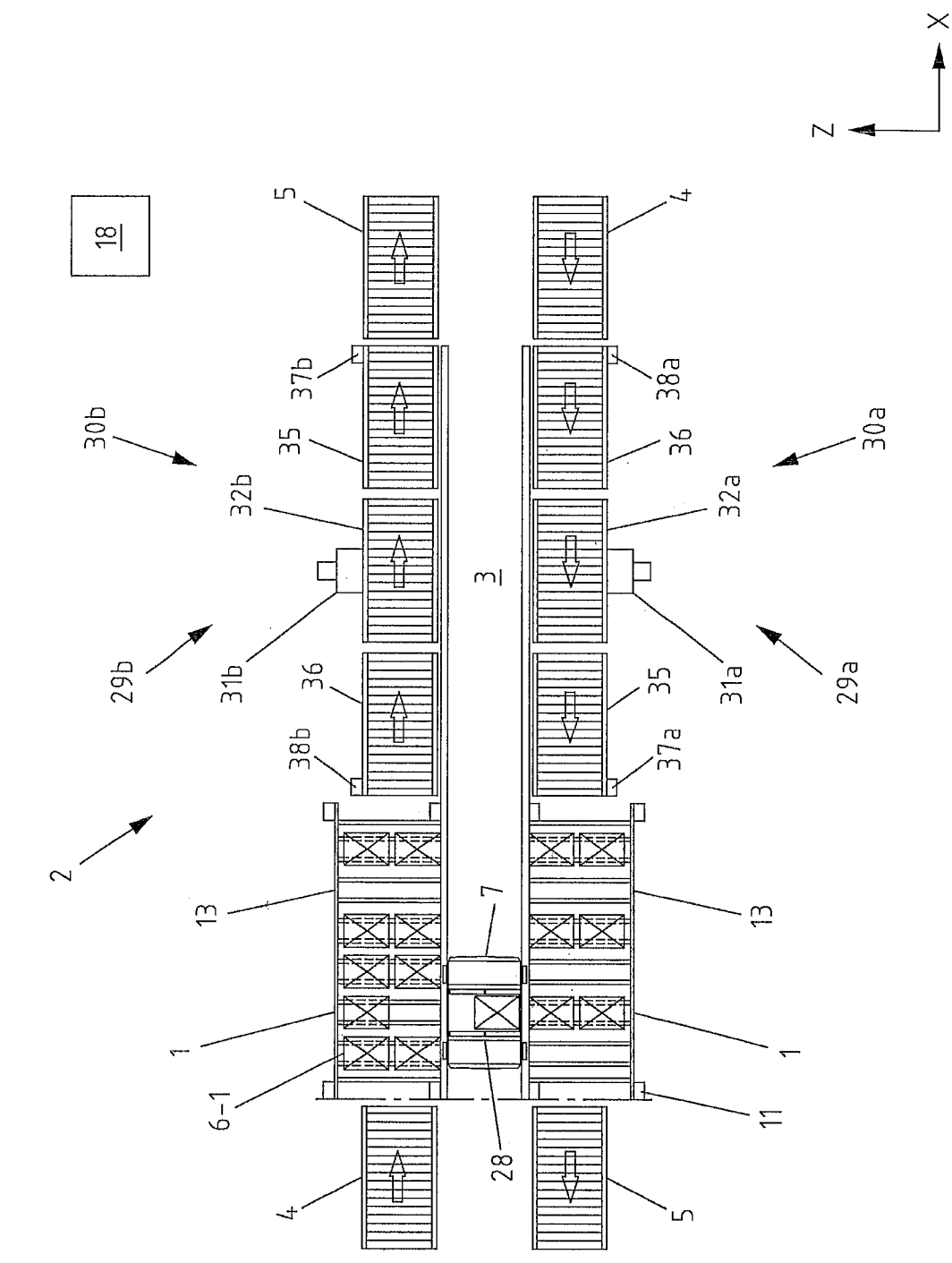
Figure 5:
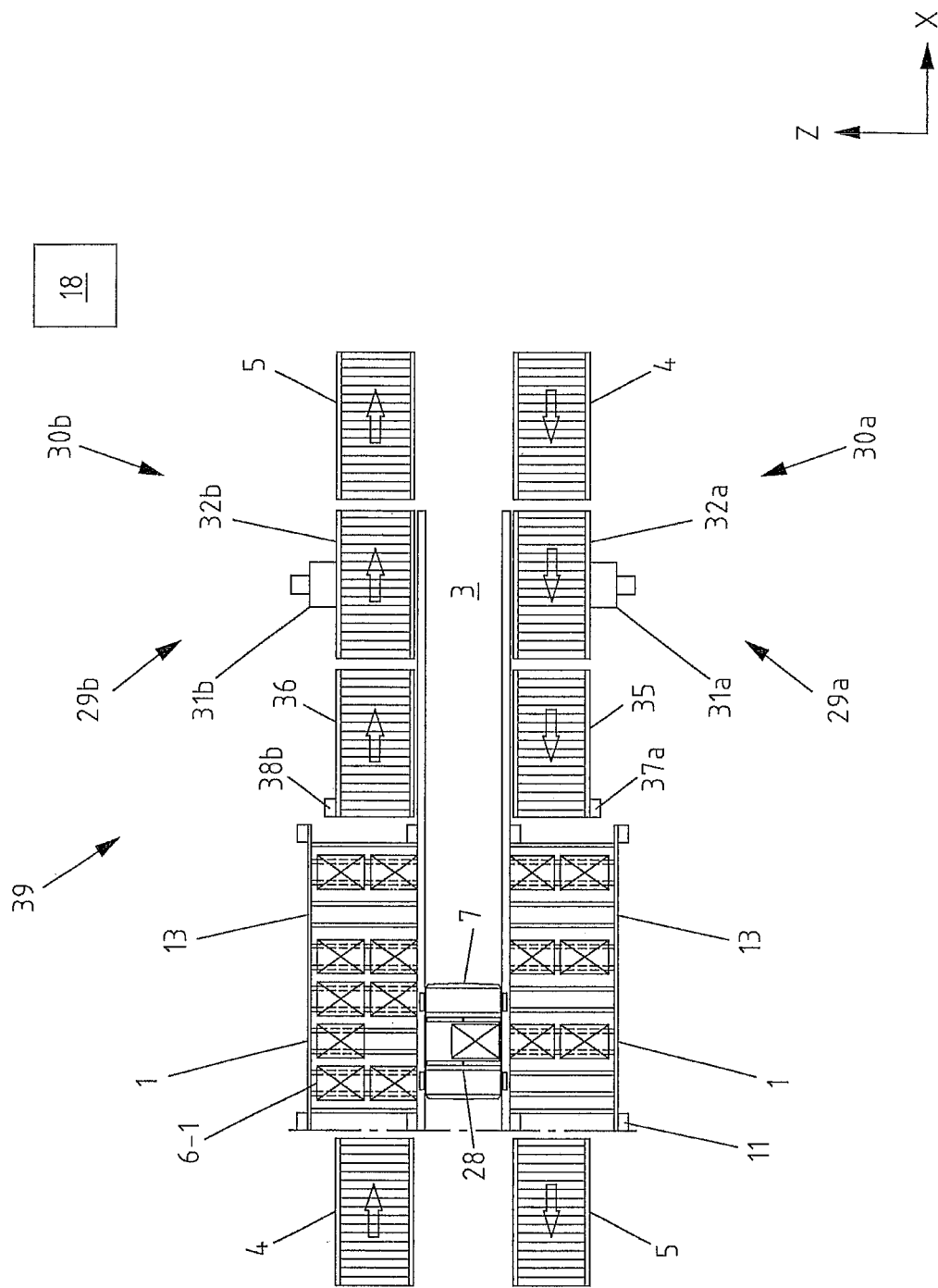
Figure 6:
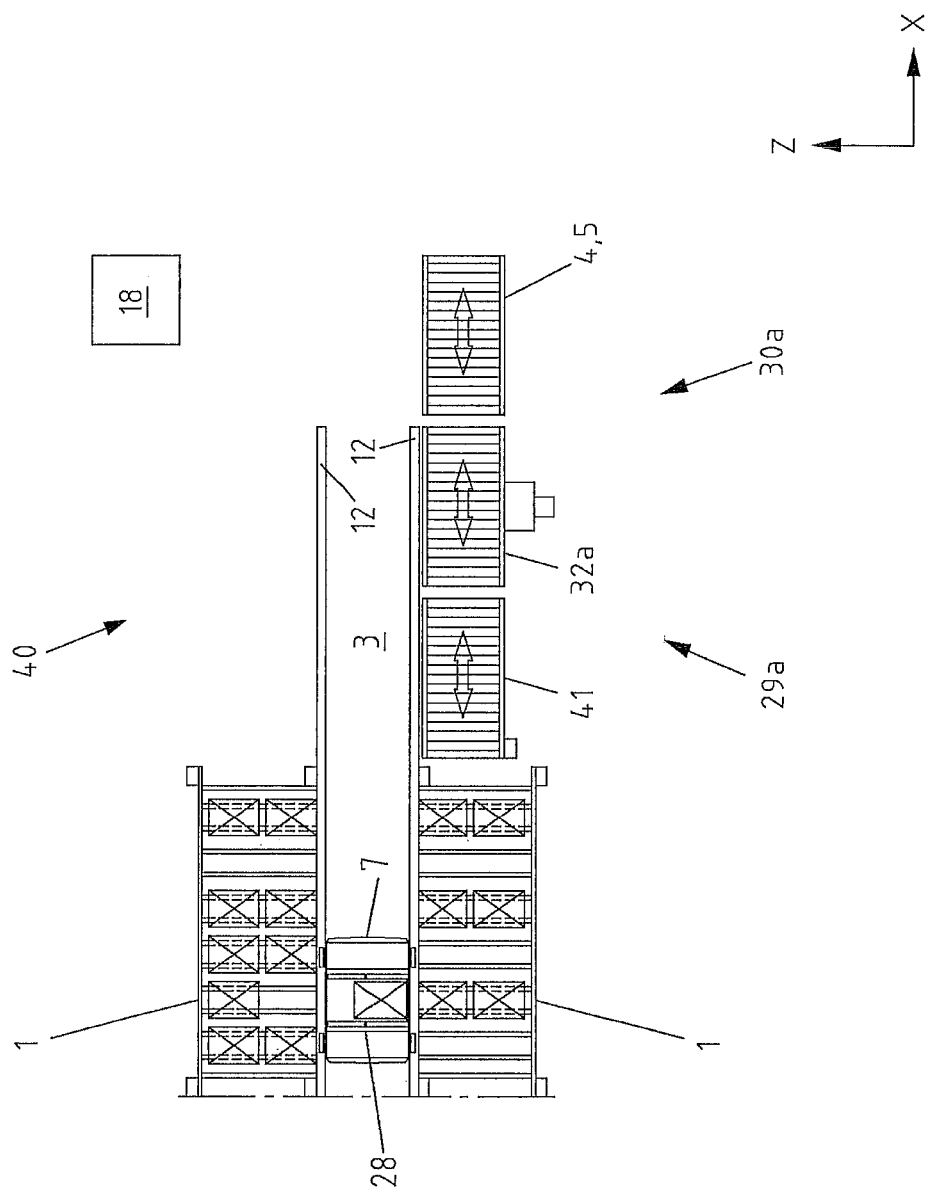
Figure 7:
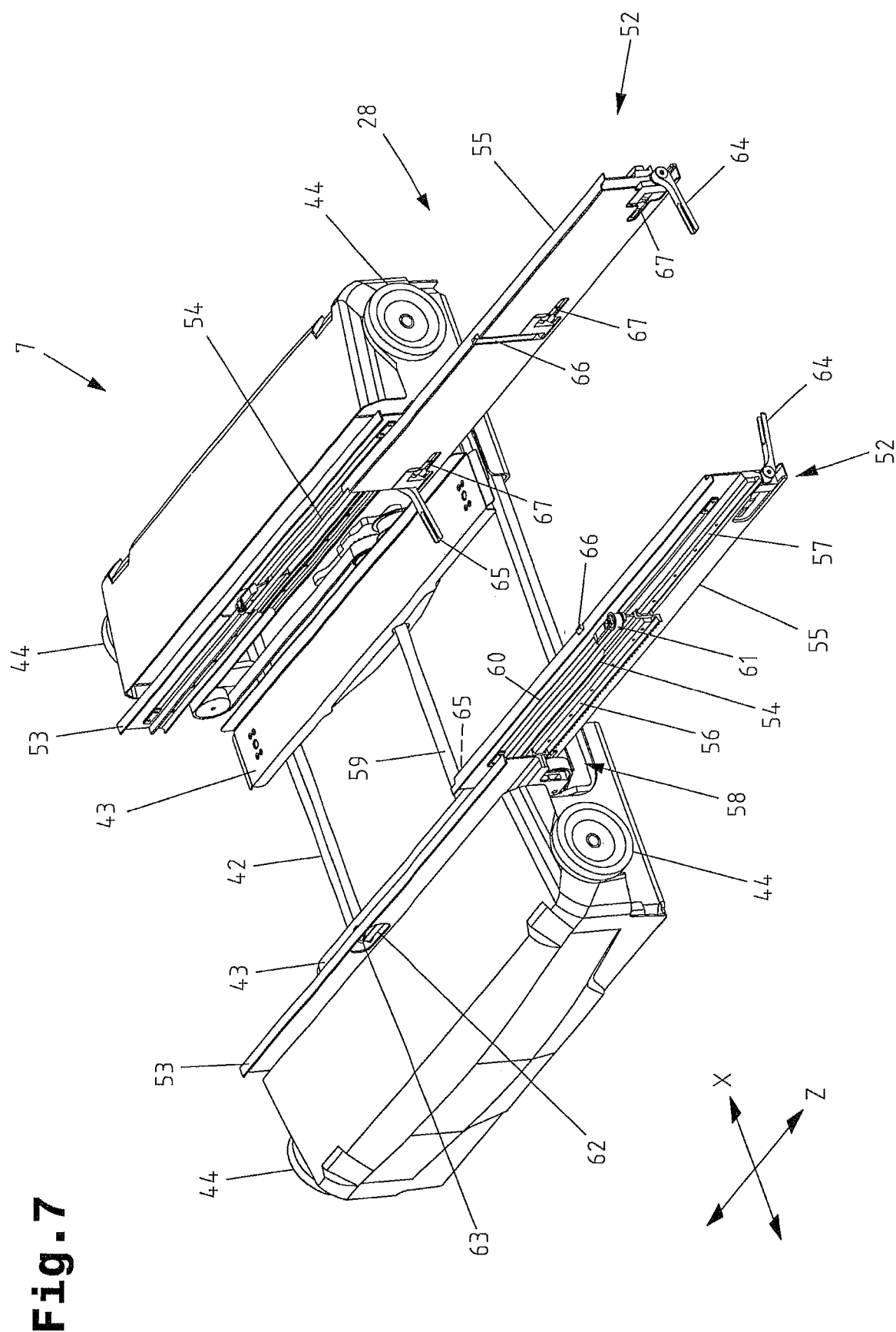
Figure 10B:
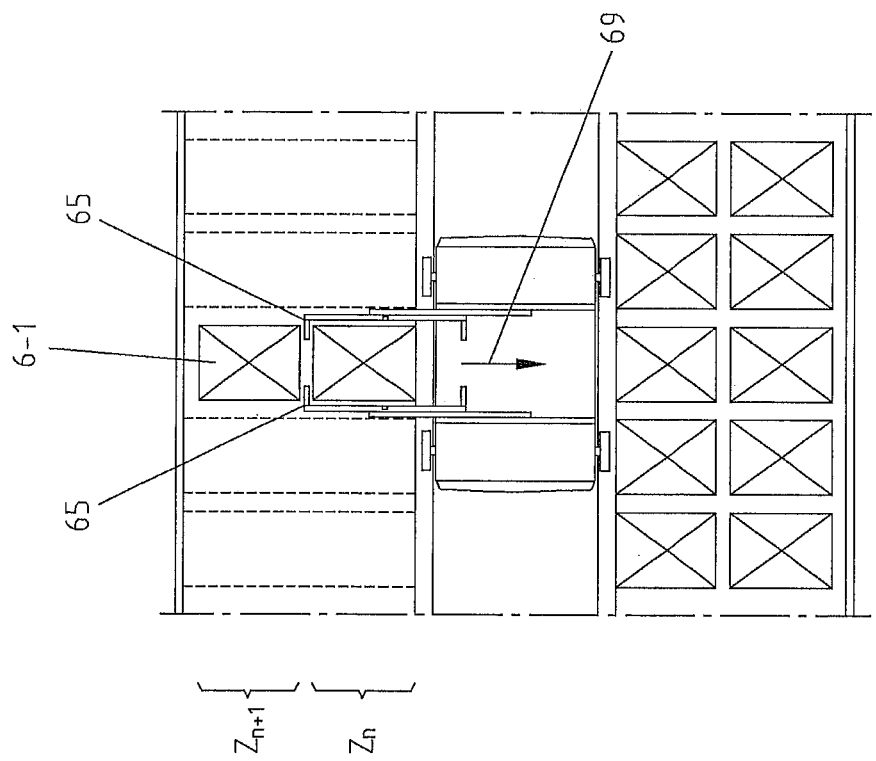
Figure 10A:
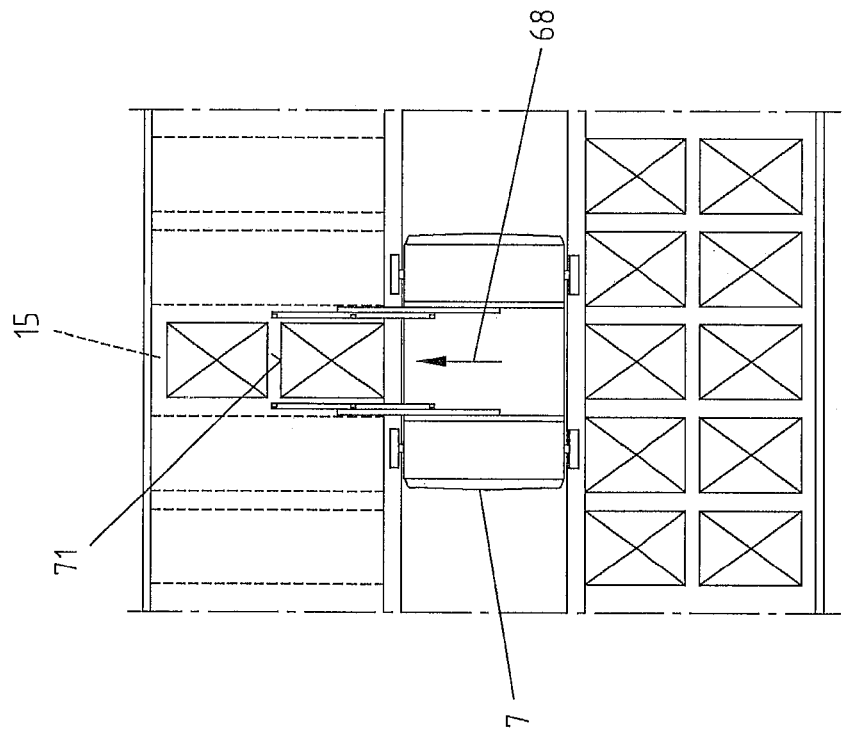

These are highly simplified, schematic diagrams illustrating the following:

FIG. 1 a part of a storage system based on a first embodiment having storage racks and a unit load handling device, looking down onto a rack level from above;

FIG. 2 a view of the storage system along line II indicated in FIG. 1;

FIG. 3 a view in elevation of the storage system illustrated in FIG. 1 but without the unit load handling device;

FIG. 4 a part of a storage system based on a second embodiment having storage racks and a unit load handling device, looking down onto a rack level from above;

FIG. 5 a part of a storage system based on a third embodiment having storage racks and a unit load handling device, looking down onto a rack level from above;

FIG. 6 a part of a storage system based on a fourth embodiment having storage racks and a unit load handling device, looking down onto a rack level from above;

FIG. 7 a unit load receiving device having a first embodiment of a transport device for transferring unit loads to storage channels and retrieving unit loads from storage channels, seen in a perspective view;

FIG. 8 a detail illustrated on a larger scale showing a storage rack and the unit load receiving device based on FIG. 7, seen in an end view;

FIGS. 9a to 9h a sequence diagram for an operation of transferring unit loads of a first length dimension for storage using the transport device based on FIG. 7;

FIGS. 10a to 10b a sequence diagram for an operation of retrieving unit loads of a first length dimension;

FIGS. 11a to 11i a sequence diagram for an operation of transferring unit loads of a second length dimension for storage;

FIG. 12 a unit load receiving device having a second embodiment of a transport device for transferring unit loads to storage channels and retrieving unit loads from storage channels, seen in a perspective view;

FIGS. 13a to 13h a sequence diagram for an operation of storing unit loads, for example of a first length dimension, using the transport device based on FIG. 12.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

FIGS. 1 to 3 illustrate a first embodiment of a storage system comprising storage racks 1 disposed in a parallel arrangement, a unit load handling device 2, at least one rack aisle 3 extending between the storage racks 1 and along the unit load handling device 2 in an x-direction, a conveyor system 4, 5 connected to the unit load handling device 2 for transporting incoming unit loads 6-1, 6-2 and for transporting outgoing unit loads 6-1, 6-2 and at least one unit load receiving device 7 for transferring the unit loads 6-1, 6-2 to the storage channels 15 and/or retrieving unit loads 6-1, 6-2 from the storage channels 15. In the example illustrated, there are two storage racks 1. In the context of the invention, however, there may also be more than two storage racks 1, in which case a rack aisle 3 is respectively provided between adjacent storage racks 1. The conveyor system 4, 5 is only partially illustrated in FIG. 1 with a view to retaining better clarity.

The unit loads 6-1, 6-2 are boxes (packaging units) or loading aids (LHM) such as trays or containers, by means of which individual articles or at least one box can be conveyed and stored by each loading aid. The boxes contain individual articles, for example from the textile sector or food industry.

The storage racks 1 may comprise vertical front rack posts 10 respectively adjacent to the rack aisle 3 and vertical rear rack posts 11 disposed at a distance back from the rack aisle 3. The front rack posts 10 are connected to front longitudinal members 12 extending horizontally in the direction of the rack aisle 3 and the rear rack posts 11 are connected to rear longitudinal members 13 extending horizontally in the direction of the rack aisle 3. Transverse members 14 extending in the depth direction of a storage rack 1 (z-direction) may be provided between the longitudinal members 12, 13. In this case, the top face of the transverse members 14 constitutes a storage surface or storage channel 15. A unit load 6-1, 6-2 is stored on at least two transverse members 14, depending on the width dimension.

However, another embodiment (not illustrated) would also be possible in which the storage racks 1 respectively comprise front rack posts, rear rack posts, front longitudinal members and rear longitudinal members connected to the latter and a storage shelf, for example solid or mesh shelving, disposed on each rack level between the longitudinal members and secured thereto. The top face of the storage shelf provides a storage surface extending in the depth direction (z-direction) between the front longitudinal members and rear longitudinal members on each rack level. In the lengthways direction (x-direction) of the storage rack, the storage surface extends at least between the successive front rack posts and rear rack posts on each rack level. In this case, the storage shelf constitutes a storage surface or storage channels 15.

Accordingly, every storage rack 1 forms a plurality of mutually adjacent storage channels 15 in rack levels (RE) lying one above the other which extend in the z-direction between the mutually remote longitudinal sides 8, 9 (FIG. 9a) of the storage rack 1. The storage channels 15 thus have a uniform storage depth 16 (FIG. 9a).

Depending on a length dimension of the unit loads 6-1, 6-2 that are to be temporarily stored in the storage channels 15, every storage channel 15 is able to accommodate a corresponding number of unit loads 6-1, 6-2. In this respect, the length dimension extends in the direction of the longitudinal extension of the storage channel 15 once the unit load 6-1, 6-2 has been deposited in the storage channel 15. The width dimension of the unit loads 6-1, 6-2, on the other hand, will determine the number of adjacently lying storage channels 15. The width dimension extends transversely to the longitudinal extension of the storage channel 15 once the unit load 6-1, 6-2 has been deposited in the storage channel 15. The unit loads 6-1, 6-2 usually have a length dimension of between 100 mm and 1200 mm, in particular between 150 mm and 850 mm, and a width dimension of between 100 mm and 1200 mm, in particular between 150 mm and 850 mm. With a view to retaining greater clarity, however, the unit loads 6-1, 6-2 illustrated in FIG. 1 are shown as having the same width dimension. The expression first length dimension 19 (FIG. 9f) will be used below and should be understood as meaning unit loads 6-1 with a length that is greater than a longitudinal distance between an outer transport element 64, 65 and an inner transport element 66. The first length dimension 19 should be understood as being a length range with a lower limit (minimum first length dimension) and an upper limit (maximum first length dimension). For example, the length range for the first length dimension 19 may be between 451 mm and 705 mm. The expression second length dimension 20 (FIG. 11f) will be used to refer to unit loads 6-2 having a length that is shorter than a distance between an outer transport element 64, 65 and an inner transport element 66. The second length dimension 20 should be understood as being a length range with a lower limit (minimum second length dimension) and an upper limit (maximum second length dimension). For example, the length range for the second length dimension 20 is between 150 mm and 450 mm.

It should be pointed out that the expression "storage channel" should be construed as meaning a storage space "fictitiously" designated by an electronic control unit 18. Whilst a "usable" storage depth 16 of the storage channels 15 does not vary, a storage width 17 (FIG. 9a) will vary depending on the width dimension of the unit loads 6-1, 6-2. The storage space for each unit load 6-1, 6-2 is based on the storage depth 16 of the storage channel 15 and the width dimension of the unit loads 6-1, 6-2 that can be stored in this storage channel 15. It is preferable if unit loads 6-1, 6-2 having at least the same length dimension 19, 20 are stored in one storage channel 15. Within the context of the invention, however, it would also be possible to store unit loads 6-1, 6-2 of different length dimensions 19, 20 in one storage channel 15. The same applies to the width dimension of unit loads 6 that can be stored in one storage channel 15.

The storage channels 15 each have a storage depth 16 that enables two unit loads 6-1 of a first length dimension 19 or more than two unit loads 6-2 of a second length dimension 20 to be stored. The maximum storage depth 16 or length of the storage channel 15 in the embodiment illustrated is less than 1600 mm, for example 1525 mm.

This being the case, different numbers of unit loads 6-1, 6-2 can be transferred to and stored in depth positions $Z_n$, $Z_{n+1}$, $Z_{n+2}$, etc., lying respectively one behind the other in the depth direction (z-direction) by means of a transport device 28 (FIG. 7) that will be described in more detail below and using a method for transferring them to the storage channels 15 that will be described in more detail below. For example, two unit loads 6-1 can be transferred by the transport device 28 (FIG. 7) and using the storage method (FIG. 9a-9h) into the storage channels 15 to depth positions $Z_n$, $Z_{n+1}$ lying one behind the other respectively in the depth direction (z-direction). Alternatively, three unit loads 6-2 can be transferred by the transport device 28 (FIG. 7) and using the storage method (FIG. 11a-11i) into the storage channels 15 to depth positions $Z_n$, $Z_{n+1}$, $Z_{n+2}$ lying one behind the other respectively in the depth direction (z-direction). In FIG. 1, four unit loads 6-2 are being stored in depth positions $Z_n$, $Z_{+1}$, $Z_{n+2}$, $Z_{n+3}$ lying one behind the other respectively in the depth direction (z-direction) in some of the storage channels 15.

A width 22 (FIG. 9a) of the unit load receiving device 7, on the other hand, is shorter than a storage depth 16 and is such that a single unit load 6-1 of the first length dimension 19 can be conveyed on a receiving platform 43 (FIG. 7) and is then positioned between the outer transport elements 64, 65. Alternatively, it is also possible for several unit loads 6-2 of the second length dimension 20 to be conveyed, in which case a first unit load 6-2 is positioned between the first outer transport element 64 and an inner transport element 66 and a second unit load 6-2 is positioned between the second outer transport element 65 and an inner transport element 66. However, another option is for the unit load receiving device 7 to convey just one unit load 6-2 of the second length dimension 20, in which case this unit load 6-2 is then positioned either between the first outer transport element 64 and an inner transport element 66 or between the second outer transport element 65 and an inner transport element 66, as illustrated FIG. 11a. In the case of the embodiment illustrated, the width 22 of the unit load receiving device 7 is less than 1100 mm, for example 1000 mm.

This embodiment has proved to be of advantage because with a relatively short width 22 of the unit load receiving device 7 and/or narrow rack aisle 3, it enables multi-depth storage of unit loads 6-1, 6-2 in a storage channel 15 having a bigger storage depth 16. Accordingly, the ratio of spatial capacity to available storage capacity can be increased.

In principle, the unit load 6 may also have a (third) length dimension which is bigger than a first length dimension. This is illustrated in FIG. 3. However, such a unit load 6 can be positioned on the unit load receiving device 7 between the first outer transport element 64 and second outer transport element 65 as described above but due to the limited storage depth 16, only a single unit load 6 can be stored in a storage channel 15. In this case, the storage arrangement is the same as that known from the prior art.

This means that unit loads 6 of differing length dimensions can be stored in the storage channels 15. For example, in a first storage channel 15 or some first storage channels 15, unit loads 6-1 of the first length dimension can be stored, in a second storage channel 15 or some second storage channels 15, unit loads 6-2 of the second length dimension can be stored and/or in a third storage channel 15 or some third storage channels 15, unit loads 6 of the third length dimension can be stored. In principle, it is also possible to store unit loads 6-1, 6-2 of different length dimensions 19, 20 in a storage channel 15, for example a unit load 6-1 of the first length dimension 19 and two unit loads 6-2 of the second length dimension 20.

Based on the embodiment illustrated, the storage system comprises unit load receiving devices 7 which can be moved in (horizontal) travel planes 27 lying one above the other in the rack aisle 3 and which can be activated independently of one another by the control unit 18 in order to transfer the unit loads 6, 6-1, 6-2 to the storage channels 15 and/or retrieve unit loads 6, 6-1, 6-2 from the storage channels 15. At least one unit load receiving device 7 may be provided for every rack level (RE). A unit load receiving device 7 therefore services a rack level by means of a transport device 28. The transport device 28 is able to transfer one or more unit loads 6, 6-1, 6-2 to the storage channels 15 or retrieve them from the storage channels in a transverse direction (z-direction) on two sides. In the embodiment illustrated as an example, the travel planes 27 and rack levels (RE) lie substantially at the same height and the longitudinal members 12 extending in the longitudinal direction of the rack aisle 3 (x-direction) and lying opposite one another in pairs respectively constitute a travel plane 27 along which the unit load receiving device 7 is moved.

However, in the case of other embodiments, although these are not illustrated, there may be fewer unit load receiving devices 7 than rack levels (RE) if the unit load receiving device 7 comprises transport devices 28 disposed one above the other on different levels. The transport devices 28 can be activated by the control unit 18 independently of one another, and a first transport device 28 is able to transfer one or more unit loads 6, 6-1, 6-2 to a storage channel 15 and/or retrieve them from a storage channel 15 in a transverse direction (z-direction) on a first rack level (RE) and a second transport device 28 is able to transfer one or more unit loads 6, 6-1, 6-2 to a storage channel 15 and/or retrieve them from a storage channel 15 in a transverse direction (z-direction) on a second rack level (RE). Accordingly, a unit load receiving device 7 is able to service more than one rack level, for example two rack levels, via two transport devices 28, for example. The travel planes 27 no longer lie in every rack level (RE) but are substantially on a level with every second rack level (RE), and the longitudinal members 12 extending in the longitudinal direction of the rack aisle 3 (x-direction) and lying opposite one another in pairs respectively constitute a travel plane 27 along which the unit load receiving device is moved.

If, on the other hand, a special lifting device is used, the number of unit load receiving devices 7 will also be less than the number of travel planes 27. In this instance, the unit load receiving devices 7 can be deployed between the travel planes 27. Such a lifting device is known from WO 2012/106744 A1 or WO 2012/106745 A1, for example.

The unit load handling device 2 illustrated in FIGS. 1 to 3 is disposed between oppositely lying ends of the storage racks 1 and comprises a first unit load lifting device 29a, a first buffer device 30a, a second unit load lifting device 29b and a second buffer device 30b.

The unit load lifting devices 29a, 29b are of a stationary construction and respectively comprise a transport device 32a, 32b which can be raised and lowered by means of a lifting drive 31a, 31b. The lifting drive 31a, 31b comprises a schematically illustrated drive motor 33a, 33b which is connected to the control unit 18. The transport devices 32a, 32b are each preferably mounted on a vertical mast. The transport devices 32a, 32b respectively comprise a conveyor device which can be driven by means of a conveyor drive 34a, 34b with a conveying direction extending parallel with the rack aisle 3, as indicated by the arrows in FIG. 1. The conveyor drive is connected to the control unit 18. The conveyor devices are roller conveyors or belt conveyors, for example.

The buffer devices 30a, 30b each comprise first waiting devices 35 on one side of the unit load lifting device 29a, 29b in the direction of the rack aisle 3 and in at least some of the rack levels (RE) for temporarily buffering one or more unit loads 6 waiting to be stored and second waiting devices 36 on the other side of the second unit load lifting device 29a, 29b in the direction of the rack aisle 3 and in at least some of the rack levels (RE) for temporarily buffering one or more unit loads 6 waiting to be retrieved. As illustrated, the first waiting devices 35 and second waiting devices 36 are provided respectively in all rack levels (RE). The first waiting devices 35 constitute a first buffer region, namely a goods-in buffer region, and the second waiting devices 36 constitute a second buffer region, namely a goods-out buffer region, and every unit load lifting device 29a, 29b co-operates with the first and second buffer region. Based on this embodiment, the waiting devices 35, 36 each have a conveyor device which can be driven by means of a conveyor drive 37a, 37b, 38a, 38b, for example a roller conveyor. Accordingly, the waiting devices 35, 36 are motor-driven waiting devices.

As may be seen from FIG. 1, the front longitudinal members 12 extend along the storage racks 1 and the unit load handling device 2 (unit load lifting device 29a, 29b and buffer devices 30a, 30b) in the longitudinal direction of the rack aisle 3 (x-direction) and in at least some of the rack levels (RE), preferably in every rack level (RE). The unit load receiving devices 7 may be moved along the longitudinal members 12 for transferring unit loads 6, 6-1, 6-2 and retrieving unit loads 6, and unit loads 6, 6-1, 6-2 to be retrieved can be removed from the storage channels 15 and transferred to the waiting devices 36 of buffer device 30a or buffer device 30b by means of their transport device 28 on the one hand, and unit loads 6, 6-1, 6-2 to be transferred into storage can be removed from the waiting devices 35 of buffer device 30a or buffer device 30b and transferred to storage channels 15 by means of their transport device 28 on the other hand.

The process of storing and retrieving unit loads 6, 6-1, 6-2 by means of the conveyor systems 4, 5, the unit load handling device 2 and the unit load receiving devices 7 is described in detail in WO 2013/090970 A2 which is included in the subject matter of this disclosure.

With a view to retaining clarity, the conveyor systems 4, 5 are only partially illustrated in FIG. 1. The conveyor system 4 for conveying unit loads 6, 6-1, 6-2 to the unit load lifting device 29a, 29b and the conveyor system 5 for conveying unit loads 6, 6-1, 6-2 away from the unit load lifting device 29a, 29b extend parallel with the rack aisle 3 underneath the storage racks 1 and constitute a conveyor system plane (FE).

The transport device 32a, 32b, which can be raised and lowered, can be positioned on a level with the conveyor system plane (FE) between the oppositely lying conveyor systems 4, 5 and on a level with the rack levels (RE) between the oppositely lying waiting devices 35, 36 in order to convey unit loads 6, 6-1, 6-2 to be transferred to storage/retrieved from storage between the transport device 32a, 32b and the respective conveyor system 4, 5 and between the transport device 32a, 32b and the respective waiting device 35, 36 of the first/second buffer device 30a, 30b.

Based on another embodiment illustrated in FIG. 4, the unit load handling device 2 described above is disposed in front of the end of the storage racks 1. The front longitudinal members 12 again extend along the storage racks 1 and unit load handling device 2 (unit load lifting device 29a, 29b and buffer devices 30a, 30b) in the longitudinal direction of the rack aisle 3 (x-direction) and in at least some of the rack levels (RE), preferably in every rack level (RE). Unit loads 6, 6-1, 6-2 can be transferred to storage and retrieved from storage as described above.

The unit load handling devices 2 described above and illustrated in FIGS. 1 and 4 may therefore be a unit load handling device 2 integrated in the storage racks 1 or disposed in front of the storage racks 1 and may also have just a single unit load lifting device 29a and a single buffer device 30a, although this is not illustrated.

Based on one embodiment illustrated in FIG. 5, the unit load handling device 39 is disposed in front of the end of the storage racks 1 and comprises the first unit load lifting device 29a, the first buffer device 30a, the second unit load lifting device 29b and the second buffer device 30b. The first waiting devices 35 constitute a first buffer region, namely a goods-in buffer region, and the second waiting devices 36 constitute a second buffer region, namely a goods-out buffer region. Based on this embodiment, the first buffer device 30a and second buffer device 30b each comprise the waiting devices 35, 36 for temporarily buffering one or more unit loads 6, 6-1, 6-2 to be transferred to storage and to be retrieved, disposed exclusively on one of the sides of the first/second unit load lifting device 29a, 29b in the direction of the rack aisle 3 and in at least some of the rack levels (RE). Naturally, it would also be possible for the unit load handling device 39 to be integrated in the storage racks 1 in this embodiment.

FIG. 6 illustrates an embodiment where the unit load handling device 40 is disposed in front of the end of the storage racks 1. It comprises the first unit load lifting device 29a and the first buffer device 30a. The buffer device 30a comprises waiting devices 41 for temporarily buffering one or more unit loads 6, 6-1, 6-2 waiting to be transferred to storage and/or retrieved from storage, disposed on a single side of the unit load lifting device 29a in the direction of the rack aisle 3 and in at least some of the rack levels (RE). In this respect, it should be noted that by contrast with the embodiments described above, the waiting devices 41 used in every rack level (RE) in this instance may also be provided with a reversing mode. If the waiting devices 41 comprise conveyor devices, their conveying directions can be reversed, as indicated by the double arrow. Again with this embodiment, it would also be possible for the unit load handling device 40 to be integrated in the storage racks 1.

FIGS. 7 and 8 illustrate another possible embodiment of the unit load receiving device 7, which in this instance is a single-level storage and retrieval unit.

As is also the case with the previous drawing, the unit load receiving device 7 has a support frame 42, a receiving platform 43, wheels 44, a travel drive having at least one drive motor 45 for driving at least one wheel 44, a guide device 46 with lateral guide wheels, an actuating drive having at least one drive motor 47 for extending/retracting the transport device 28, an electronic control system 48 and the transport device 28, for example for transferring unit loads 6, 6-1, 6-2 to and/or from a storage rack 1.

An appropriate sensor system may be provided in order to detect the travel position of the unit load receiving device 7 in the x direction. By preference, a sensor 49 is provided in the form of a rotary encoder and is mounted on the drive motor 45. The distance by which the transport device 28 is extended in the z-direction can likewise be detected by an appropriate sensor system. By preference, a sensor 50 is provided in the form of a rotary encoder and is mounted on the drive motor 47.

As illustrated in FIG. 8, the power and/or data supply of the unit load receiving device 7, in particular the drive motors 45, 47 and electronic control system 48, is provided via a contact line arrangement 51 which is secured to every one of the front longitudinal members 12 (guide rails) in every travel plane 27 and extends across the entire length of the longitudinal member 12. The unit load receiving device 7 in turn comprises a current collector by means of which it contacts the contact lines of the contact line arrangement 51 for a supply of power and/or data.

As illustrated in more detail in FIG. 7, the transport device 28 (load receiving device) may comprise telescopic units 52 disposed parallel with one another on the support frame 42 which can be synchronously extended from an initial position (FIG. 9a; FIG. 11a) in both directions so that unit loads 6, 6-1, 6-2 can be transferred to and unit loads 6, 6-1, 6-2 retrieved from the storage racks 1 disposed on either side of the unit load receiving device 7. The extension distance or extension length of the transport device 28 or telescopic unit(s) 52 from the unit load receiving device 7 and hence the length of the transport device 28 or telescopic unit(s) 52 extending out from the unit load receiving device 7 in the z-direction is less than 1500 mm in the embodiment illustrated.

The telescopic units 52 each have a base frame 53 and a rail 54, 55 which can be horizontally retracted and/or extended relative to the base frame 53 in one direction (z-direction). The telescopic units 52 form telescopic arms. The first rail 54 is mounted on the base frame 53 so as to be displaceable by means of a guide arrangement 56 and the second rail 55 is mounted on the first rail 54 so as to be displaceable by means of a guide arrangement 57. The first rail 54 can be moved relative to the base frame 53 with the aid of a schematically indicated drive device 58, for example a toothed belt and rack arrangement. Alternatively, it would also be possible to use a chain and rack arrangement. The endless traction means (toothed belt or chain) is coupled with an electric drive motor 47 (schematically indicated in FIG. 8). The toothed belts for the two first rails 54 are preferably coupled with one another via a common drive shaft 59. Another option would be to provide separate drive devices 58. The telescopic unit 52 then comprises exclusively one first rail 54 and one second rail 55. The telescopic unit(s) 52, in particular the base frame 53, first rail 54 and second rail 55, have a length dimension of less than 1000 mm, for example 990 mm, in the embodiment illustrated.

As may also be seen from FIG. 7, a first belt 60 is looped around a (front) first roller 61 mounted on the first rail 54 and is secured by its first end to the base frame 53 and by its second end to the second rail 55. A second belt 62 is looped around a (rear) second roller 63 mounted on the first rail 54 and is secured by its first end to the base frame 53 and by its second end to the second rail 55. When the first rail 54 is moved by the drive device 58, the second rail 55 is also moved by the belts 60, 62, in other words either retracted or extended.

The second rails 55 respectively comprise transport elements 64, 65, 66 for transporting unit loads 6, 6-1, 6-2 between the storage channel 15 and the unit load receiving device 7. There is a difference between the outer transport elements 64, 65 and inner transport elements 66.

The outer transport elements 64, 65 are disposed in oppositely lying end sections of the second rail 55 and each transport element 64, 65 (driver element) is coupled with an electric drive motor 67 and can be moved by the latter between an initial position and an operating position. In the initial position, the outer transport elements 64, 65 are moved out of a transport path for the unit loads 6, 6-1, 6-2 so that the unit load 6, 6-1, 6-2 is able to move past the transport elements 64, 65 and in the operating position, the transport elements 64, 65 are moved into the transport path for the unit loads 6, 6-1, 6-2 so that the respective transport elements 64, 65 positively engage behind the unit load 6, 6-1, 6-2.

The inner transport element 66 is disposed on the second rail 55, centrally between the outer transport elements 64, 65, and the inner transport element 66 (driver element) is coupled with an electric drive motor 67 and is moved by the latter between an initial position and an operating position. In the initial position, the inner transport element 66 is moved out of a transport path for the unit loads 6, 6-1, 6-2 so that the unit load 6, 6-1, 6-2 is able to move past the inner transport element 66 and in the operating position, the inner transport element 64, 65 is moved into the transport path for the unit loads 6, 6-1, 6-2 so that the transport element 66 positively engage behind the unit load 6, 6-1, 6-2.

Although, based on a preferred embodiment, every second rail 55 is provided with transport elements 64, 65, 66 co-operating in pairs, it would also be conceivable for only one of the second rails 55 to be provided with the transport elements 64, 65, 66. Also, the transport device 28 may have only a single telescopic unit 52, although this is not illustrated.

It has also proved to be of advantage if the telescopic units 52 are also mounted on the support frame 42 so as to be displaceable relative to one another and in an x-direction by means of an actuating drive (not illustrated). This being the case, a distance between the telescopic units 52 can be varied and adjusted to the respective width dimensions of the unit loads 6, 6-1, 6-2. Alternatively, the distance between the telescopic units 52 may be adjusted solely as a means of aligning (centering) a unit load 6, 6-1, 6-2 when it is disposed on the unit load receiving device 7. The design of such an actuating drive for adjusting the distance and effecting the telescoping movement is described in detail in U.S. Pat. No. 6,923,622 B2, the subject matter of which is included in this disclosure.

The drive motor 45 for the travel drive and the drive motor 47 for the actuating drive are connected to the electronic control system 48 of the unit load receiving device 7, and the electronic control system 48 is connected to the control unit 18 in order to receive travel commands, storage and/or retrieval commands and/or control signals from it.

As may also be seen in FIG. 7, the receiving platform may be formed by unit load supports 43 extending in the z-direction. If a system for adjusting the distance between the telescopic units 52 is provided, the unit load supports 43 are also mounted on the support frame 42 so as to be adjustable relative to one another in an x-direction.

Although not illustrated, an additional third unit load support may be provided between the unit load supports 43, which is able to provide additional support for the unit load 6, 6-1, 6-2 from underneath when it is disposed on the unit load receiving device 7. This enables unit loads 6, 6-1, 6-2 that have a low degree of dimensional stability or of "infe-rior" packaging quality to be transported more reliably. The use of cheaper packaging material is increasingly common which results in poorer packaging quality.

Alternatively, in the case of another embodiment, not illustrated, the receiving platform comprises a motorized conveyor device with a conveying direction extending parallel with the z-direction. The conveyor device is a belt conveyor or roller conveyor, for example, which is operated substantially in synchronization with the actuation speed of the telescopic units.

Figure 9H:
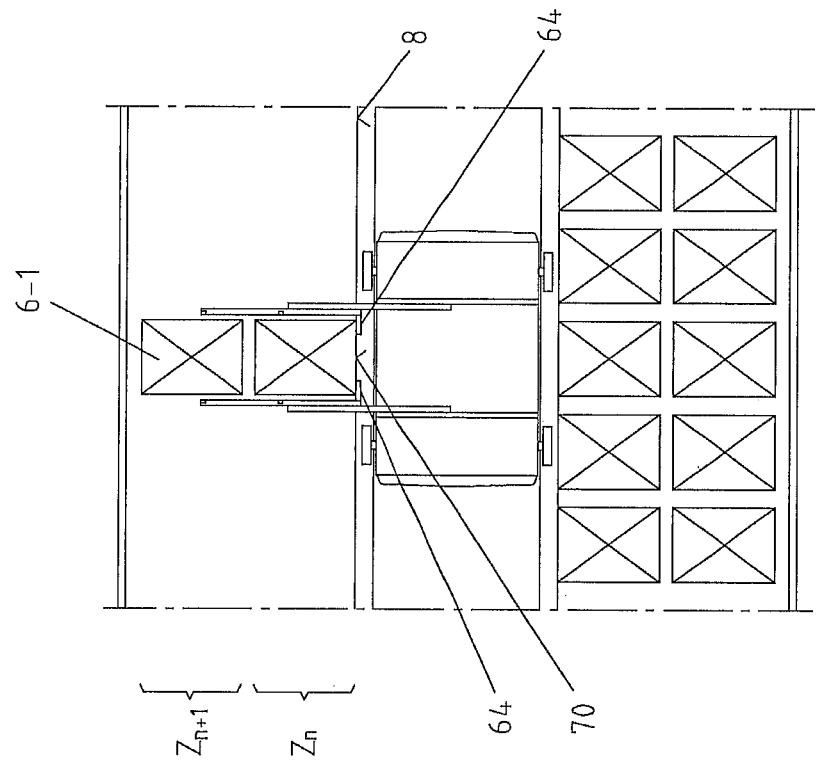
Figure 9G:
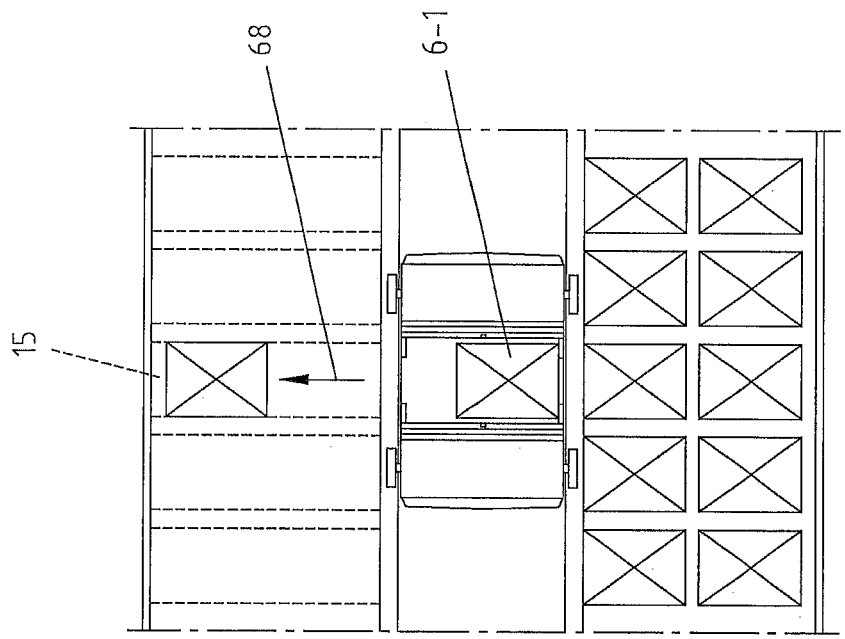

FIGS. 9a-9h illustrate the method used for transferring (storing) unit loads 6-1 respectively having a first length dimension 19 to at least one of several storage channels 15 using a sequence. To retain greater clarity, the storage channels 15 are indicated in FIGS. 9a, 9f, 9g only and are shown by broken lines denoting boundary lines.

The storage operations are based on storage orders which are electronically detected, for example at an input device, for example a computer. The storage orders are continuously transmitted to the control unit 18, which in turn co-ordinates control of the conveyor systems 4, 5, unit load receiving device(s) 7 and transport device(s) 28.

The control unit 18 determines for a storage order the storage channel 15 in which the unit loads 6-1 are to be stored. If the storage order is made up of more unit loads 6-1 than can be accommodated in one storage channel 15, a corresponding number of storage channels 15 in which the unit loads 6-1 will be stored one after the other is determined by the control unit 15.

The unit loads 6-1 are held in readiness on a waiting device 35. The unit load receiving device 7 collects the unit loads 6-1 from the waiting device 35 one after the other in order to then transfer them to a storage channel 15 designated by the control unit 18. This is illustrated in FIG. 2 by way of example in the rack level seventh from the bottom.

The unit load receiving device 7 transfers the first unit load 6-1 from the waiting device 35 to the receiving platform 43 and then moves in the x-direction to the designated storage channel 15 in which the first unit load 6-1 is to be stored. As may clearly be seen, the unit load receiving device 7 and receiving platform 43 are dimensioned in terms of width 22 so that just one single unit load 6-1 having a first length dimension 19 can be received on it. The unit load 6-1 can be picked up exclusively between the outer transport elements 64, 65 but not between one of the outer transport elements 64, 65 and the inner transport element 66.

FIG. 9a illustrates the unit load receiving device 7 after having been positioned opposite the designated storage channel 15. The first unit load 6-1 is positioned against the outer transport elements 64 which are disposed in the oppositely lying end region of the transport device 28 or second rail 55 in a first direction of adjustment (extension direction indicated by arrow 68). It is also possible for the first unit load 6-1 to be positioned by a centering stroke of the telescopic units 52 relative to the unit load receiving device 7 prior to the transfer movement into the storage channel 15 so that the first unit load 6-1 can be conveyed in an alignment parallel with the longitudinal axis of the storage channel 15.

If the receiving platform 43 comprises a conveyor device, the first unit load 6-1 can be positioned on the unit load receiving device 7 in a direction parallel with the longitudinal extension of the storage channel 15 prior to the transfer movement into the storage channel 15, in which case the first unit load 6-1 is moved via the conveyor device opposite a storage direction and positioned against the transport elements 64 of the transport device 28 or telescopic units 52 when moved into the operating position, the transport device 28 or telescopic units 52 being located in the initial position.

As may be seen from FIG. 9b, the first unit load 6-1 that is to be deposited in a depth position $Z_{n+1}$ by the outer transport elements 64, which are disposed in the oppositely lying end region of the transport device 28 or second rail 55 in a first direction of adjustment (extension direction of the transport device indicated by arrow 68), is moved in the storage channel 15 as far as an intermediate position $Z_P$, in particular pushed. In the intermediate position $Z_P$, the unit load 6-1 is disposed either completely in the storage channel 15 or partly on the receiving platform 43 of the unit load receiving device 7 and partly in the storage channel 15 of the storage rack 1.

The transport device 28 is then moved back in a second direction of adjustment (retraction direction of the transport device indicated by arrow 69) to the degree that the inner transport elements 66 are positioned behind a side wall 70 of the unit load 6-1 facing the unit load receiving device 7, as illustrated in FIG. 9c.

The inner transport elements 66, which are still in the initial position retracted away from the unit load 6-1 illustrated in FIG. 9c, are then moved into the operating position illustrated in FIG. 9d so that they engage behind the side wall 70.

The transport device 28 is then moved forward again in a first direction of adjustment (extension direction of the transport device indicated by arrow 68) so that the inner transport elements 66 move the first unit load 6-1 in the storage channel 15 from the intermediate position $Z_P$ to the second depth position $Z_{n+1}$. This is illustrated in FIG. 9e.

Now that the first unit load 6-1 is in the second depth position $Z_{n+1}$ designated by the control unit 18, the transport device 28 is moved back again in a second direction of adjustment (retraction direction of the transport device indicated by arrow 69) so that it assumes the initial position, see FIG. 9f.

The unit load receiving device 7 then travels back to the waiting device 35 again, where optionally the second unit load 6-1 having a first length dimension 19 is already waiting in readiness. The unit load receiving device 7 now transfers the second unit load 6-1 from the waiting device 35 to the receiving platform 43 and then moves in the x-direction to the designated storage channel 15 to which the first unit load 6-1 has already been transferred for storage.

FIG. 9g illustrates the unit load receiving device 7, which has been positioned opposite the designated storage channel 15. The second unit load 6-1 is positioned against the outer transport elements 64, which are disposed in the oppositely lying end region or the transport device 28 or second rail 55 in the transfer direction (storage direction indicated by arrow 68). Prior to the transfer movement, the second unit load 6-1 may be aligned in the manner described above with reference to the first unit load 6-1.

The transport device 28 is then moved in a first direction of adjustment (extension direction of the transport device indicated by arrow 68) so that the outer transport elements 64 move the second unit load 6-1 from the unit load receiving device 7 or receiving platform 43 into the storage channel 15 as far as a first depth position $Z_n$, see FIG. 9h. The second unit load 6-1 is thus moved in the depth direction of the storage channel 15 to the degree that the side wall 70 extends substantially flush with a terminal edge of the storage channel 15 or front longitudinal face 8. The expression "substantially flush" in this context should be understood as meaning that the side wall 70 of the unit load 6-1 may be offset from the terminal edge in the direction of the storage channel 15 to the degree that there is an offset distance of less than 80 mm, for example 20 mm.

As may be seen from FIG. 9h, the first unit load 6-1 and second unit load 6-1 are deposited in the storage channel 15 in the depth positions $Z_n$, $Z_{n+1}$ at a distance from one another so that the individual unit loads 6-1 can be accessed one after the other during the retrieval operation.

When the second unit load 6-1 is disposed in the storage channel 15, the transport device 28 extended into the storage channel 15, in particular the telescopic units 52, is/are moved back into an initial position.

FIGS. 10a and 10b illustrate the method for retrieving unit loads 6-1 respectively having a first length dimension 19 from at least one of several storage channels 15 on the basis of a sequence. With a view to retaining greater clarity, the storage channels 15 are indicated by broken lines denoting boundary lines.

When a unit load 6-1 has to be retrieved for a retrieval order, the unit load receiving device 7 is positioned in front of the storage channel 15 designated by the control unit 18. For example, the second unit load 6-1 has to be retrieved from depth position $Z_n$. Accordingly, the transport device 28 is moved in a first direction of adjustment (extension direction of the transport device indicated by arrow 68) so that the outer transport elements 65 are positioned behind a side wall 71 of the second unit load 6-1 that was deposited in the storage channel 15 in the first depth position $Z_n$ facing away from the unit load receiving device 7. The outer transport elements 65 which are still in the initial position moved back from the unit load 6-1 are then moved into the operating position so that they engage behind the side wall 71. As the transport device 28 is moved in a second direction of adjustment (retraction direction of the transport device indicated by arrow 69) back into the initial position, the second unit load 6-1 is moved onto the unit load receiving device 7 by the transport elements 65 moving into the operating position. The second unit load 6-1 is then conveyed to a waiting device 36 so that it can then be taken out of the storage system via the unit load lifting device 29a, 29b and conveyor system 5.

In the same manner, the first unit load 6-1 can then be retrieved from depth position $Z_{n+1}$.

Figure 11D:
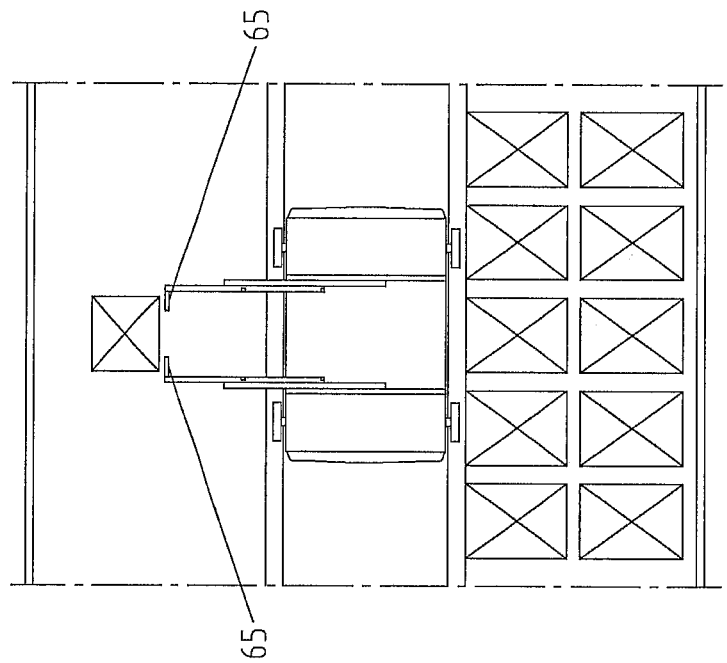
Figure 11C:
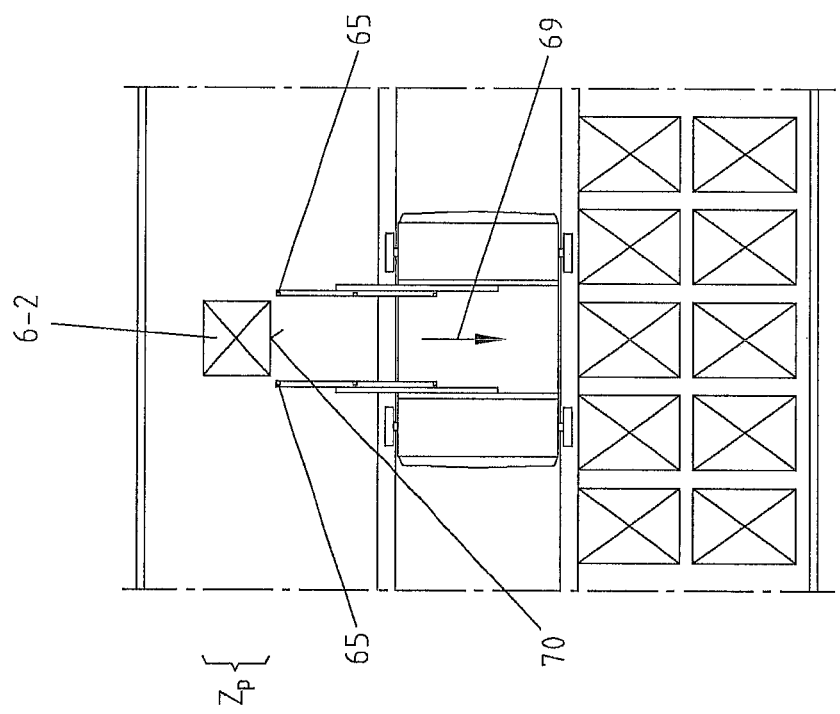
Figure 11F:
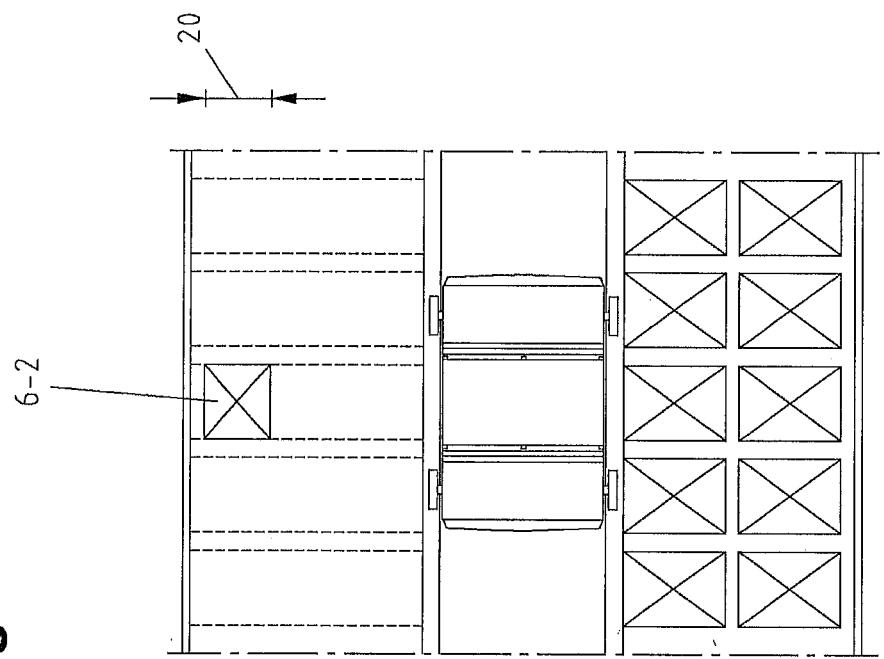
Figure 11E:
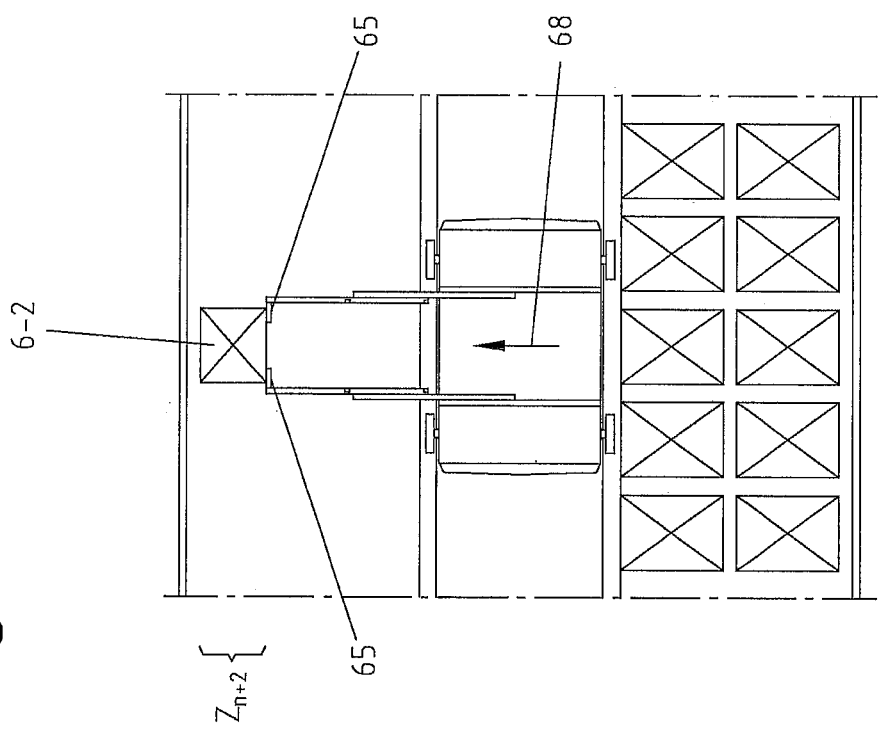
Figure 11H:
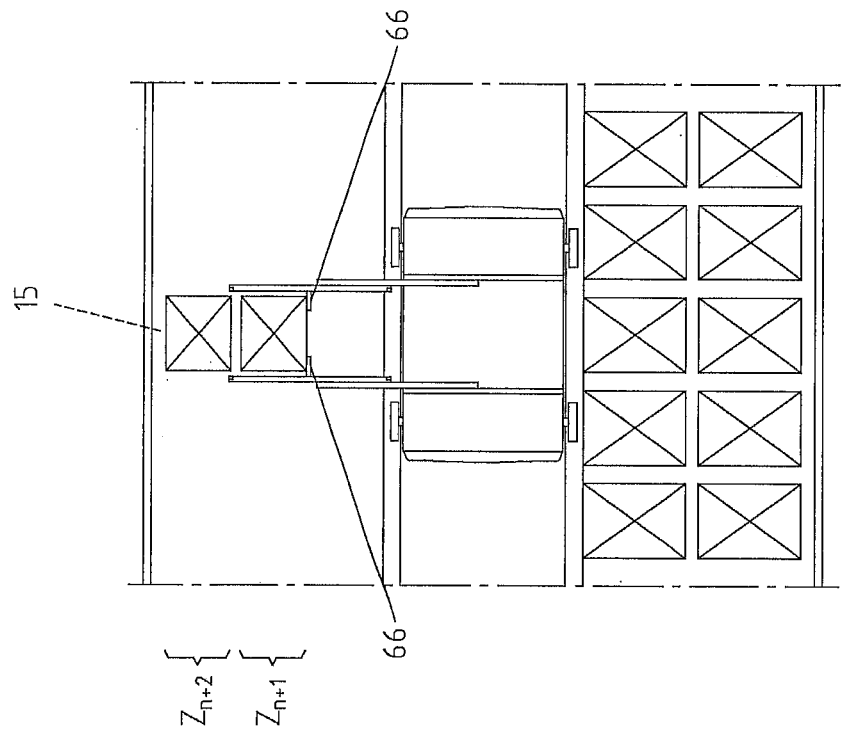
Figure 11G:
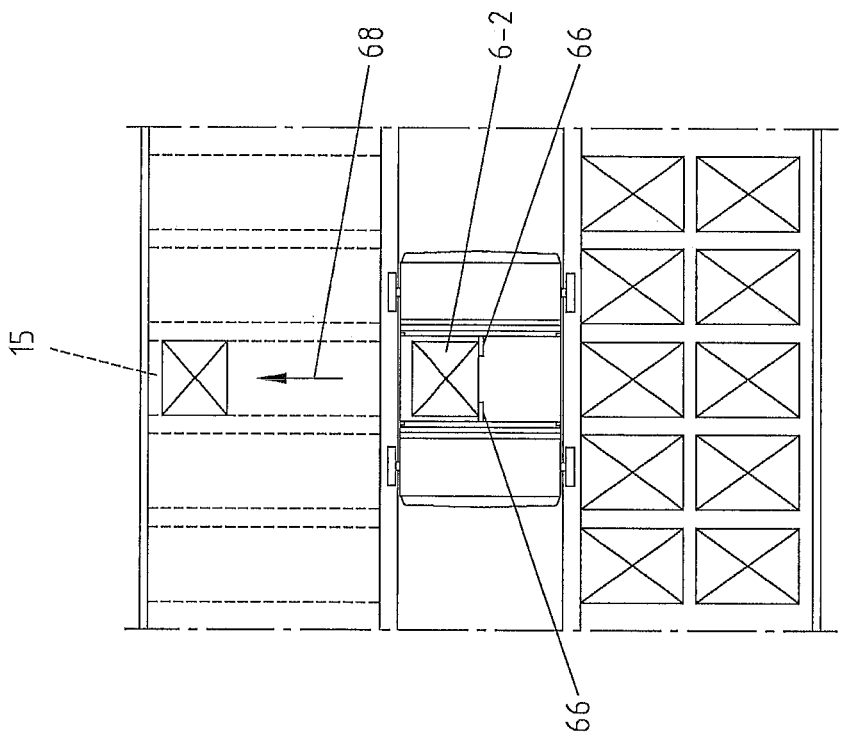

FIGS. 11a-11i are sequence diagrams illustrating the method for transferring (storing) unit loads 6-2 which are each of a second length dimension 20 from at least one of several storage channels 15. With a view to retaining greater clarity, the storage channels 15 are illustrated in FIGS. 11a, 11f, 11g only and are indicated by broken lines denoting boundary lines. The unit load 6-2 may be positioned either between the outer transport elements 64 and inner transport elements 66 or, as illustrated, between the outer transport elements 65 and inner transport elements 66.

The storage transfer operations are based on storage orders which are continuously transmitted to the control unit 18 which in turn co-ordinates control of the conveyor systems 4, 5, unit load receiving device(s) 7 and transport device(s) 28, as described above.

The unit loads 6-2 are held in readiness on a waiting device 35. The unit load receiving device 7 collects the unit loads 6-2 one after the other from the waiting device 35 in order to then transfer them to a storage channel 15 designated by the control unit 18.

The unit load receiving device 7 transfers the first unit load 6-2 from the waiting device 35 to the receiving platform 43 and then moves in the x-direction to the designated storage channel 15 in which the first unit load 6-2 is to be stored. The unit load receiving device 7 and receiving platform 43 are dimensioned in terms of width 22 so that at least one unit load 6-2 having a second length dimension 2 can be received on it.

FIG. 11*a* illustrates the unit load receiving device 7 after having been positioned opposite the designated storage channel 15. The first unit load 6-2 is positioned against the inner transport elements 66. It is also possible for the first unit load 6-2 to be positioned by a centering stroke of the telescopic units 52 relative to the unit load receiving device 7 prior to the transfer movement into the storage channel 15 so that the first unit load 6-2 can be conveyed in an alignment parallel with the longitudinal axis of the storage channel 15.

If the receiving platform 43 comprises a conveyor device, the first unit load 6-2 can be positioned on the unit load receiving device 7 in a direction parallel with the longitudinal extension of the storage channel 15 prior to the transfer movement into the storage channel 15, in which case the first unit load 6-2 is moved via the conveyor device opposite a storage direction and positioned against the transport elements 66 of the transport device 28 or telescopic units 52 when moved into the operating position, the transport device 28 or telescopic units 52 being located in the initial position.

As may be seen from FIG. 11*b*, the first unit load 6-2 that is to be deposited in a depth position $Z_{n+2}$ is moved in the storage channel 15 by the inner transport elements 66 as far as an intermediate position $Z_P$, in particular pushed. In the intermediate position $Z_P$, the unit load 6-2 is disposed either completely in the storage channel 15 or partly on the receiving platform 43 of the unit load receiving device 7 and partly in the storage channel 15 of the storage rack 1.

The transport device 28 is then moved back in a second direction of adjustment (retraction direction of the transport device indicated by arrow 69) to the degree that the outer transport elements 65, which are disposed in the oppositely lying end region of the transport device 28 or second rail 55 in a second direction of adjustment (retraction direction of the transport device indicated by arrow 69), are positioned behind a side wall 70 of the unit load 6-2 facing the unit load receiving device 7, as illustrated in FIG. 11*c*.

The outer transport elements 65, which are still in the initial position retracted away from the unit load 6-2 illustrated in FIG. 11*c*, are then moved into the operating position illustrated in FIG. 11*d* so that they engage behind the side wall 70.

The transport device 28 is then moved forward again in a first direction of adjustment (extension direction of the transport device indicated by arrow 68) so that the outer transport elements 65 move the first unit load 6-2 in the storage channel 15 from the intermediate position $Z_P$ to the third depth position $Z_{n+2}$. This is illustrated in FIG. 11*e*.

Now that the first unit load 6-2 is in the third depth position $Z_{n+2}$ designated by the control unit 18, the transport device 28 is moved back again in a second direction of adjustment (retraction direction of the transport device indicated by arrow 69) so that it assumes the initial position, see FIG. 11*f*.

The unit load receiving device 7 then travels back to the waiting device 35 again, where optionally the second unit load 6-2 having a second length dimension 20 is already waiting in readiness. The unit load receiving device 7 now transfers the second unit load 6-2 from the waiting device 35 to the receiving platform 43 and then moves in the x-direction to the designated storage channel 15 to which the first unit load 6-2 has already been transferred for storage.

FIG. 11*g* illustrates the unit load receiving device 7, which has been positioned opposite the designated storage channel 15. The second unit load 6-2 is positioned against the inner transport elements 66. Prior to the transfer movement, the second unit load 6-1 may be aligned in the manner described above with reference to the first unit load 6-1.

The transport device 28 is then moved in a first direction of adjustment (extension direction of the transport device indicated by arrow 68) so that the inner transport elements 66 move the second unit load 6-2 from the unit load receiving device 7 or receiving platform 43 into the storage channel 15 as far as a second depth position $Z_{n+1}$, see FIG. 11*h*.

The third unit load 6-2 is transferred for storage in the same manner. After positioning the unit load receiving device 7 in front of the storage channel 15, the transport device 28 is moved in a first direction of adjustment (extension direction of the transport device indicated by arrow 68) so that the inner transport elements 66 move the third unit load 6-2 from the unit load receiving device 7 or receiving platform 43 into the storage channel 15 as far as a first depth position $Z_n$, see FIG. 11*i*. The third unit load 6-2 is thus moved in the depth direction of the storage channel 15 to the degree that the side wall 70 extends substantially flush with a terminal edge of the storage channel 15 or front longitudinal face 8, as described above.

As may be seen from FIG. 11*h* and FIG. 11*i*, both the first unit load 6-2 and second unit load 6-2 as well as the second unit load 6-2 and third unit load 6-2 are deposited in the storage channel 15 in the depth positions $Z_{n+2}$, $Z_{n+1}$, $Z_n$ at a distance from one another so that the individual unit loads 6-2 can be accessed one after the other during the retrieval operation.

Based on the embodiment illustrated in FIG. 11*a* to FIG. 11*i*, the unit load 6-2 is moved by the inner transport elements 66 from the unit load receiving device 7 into the storage channel 15 either to the intermediate position $Z_P$ or to the final depth positions $Z_{n+1}$, $Z_n$.

The storage operation (not illustrated) will be different if, for example, the second unit load 6-2 is being moved from the unit load receiving device 7 into the storage channel 15 by the outer transport elements 64, which are disposed in an oppositely lying end region of the transport device 28 or second rail 55 in a first direction of adjustment (extension direction of the transport device indicated by arrow 68). In this case, the second unit load 6-2 that is to be deposited in depth position $Z_{n+2}$ is moved first of all as far as an intermediate position $Z_P$, in particular pushed. In the intermediate position $Z_P$, the unit load 6-2 is disposed either completely in the storage channel 15 or partly on the receiving platform 43 of the unit load receiving device 7 and partly in the storage channel 15 of the storage rack 1. When the second unit load 6-2 is in the intermediate position $Z_P$, the transport device 28 is moved back in a second direction of adjustment (retraction direction of the transport device indicated by arrow 69) to the degree that the inner transport elements 66 or the outer transport elements 65, which are disposed in an oppositely lying end region of the transport device 28 or second rail 55 in a second direction of adjustment (retraction direction of the transport device indicated by arrow 69), are positioned behind a side wall 70 of the unit load 6-2 facing the unit load receiving device 7. The inner transport elements 66 or outer transport elements 65, which are still in the initial position moved back from the unit load 6-2, are then moved into the operating position so that they engage behind the side wall 70. The transport device 28 is then moved forward again in a first direction of adjustment (extension direction of the transport device indicated by arrow 68) so that the inner transport elements 65 or outer transport elements 66 move the second unit load 6-2 in the storage channel 15 from the intermediate position $Z_P$ to the second depth position $Z_{n+1}$.

The storage transfer operation for the third unit load 6-2 may also be implemented such that the third unit load 6-2 is moved from the unit load receiving device 7 into the storage channel 15 by the outer transport elements 64, which are disposed in an oppositely lying end region of the transport device 28 or second rail 55 in a first direction of adjustment (extension direction of the transport device indicated by arrow 68). In this case, the outer transport elements 64 may move the third unit load 6-2 directly (in other words without the intermediate position $Z_P$) into the first depth position $Z_n$.

It should also be pointed out that in FIGS. 9a-9h and FIGS. 11a-11i, the unit loads 6-1, 6-2 are transferred into the right-hand storage rack 1. If the unit loads 6-1, 6-2 are to be stored in the left-hand storage rack 1, the second outer transport element 65 is used instead of the first outer transport element 64. Similarly, the first direction of adjustment 68 and second direction of adjustment 69 will be the opposite direction in each case. Furthermore, as illustrated, the distance by which the transport device 28 can be extended is limited by the rear longitudinal face 9 of the storage rack 1.

FIG. 12 illustrates another possible arrangement of the unit load receiving device 7', which is provided in the form of a single-level storage and retrieval unit.

With the exception of the design of the transport device 28', the unit load receiving device 7' corresponds to the unit load receiving device 7' described in detail above. To avoid unnecessary repetition, the transport device 28' and how unit loads 6, 6-1, 6-2 are stored in and retrieved from a storage rack 1 will mainly be described.

The transport device 28' (load receiving device) may comprise telescopic units 52 disposed parallel with one another on the support frame 42 which can be synchronously extended from an initial position (FIG. 13a) in both directions so that unit loads 6, 6-1, 6-2 can be transferred to and unit loads 6, 6-1, 6-2 retrieved from storage racks 1 on both sides of the unit load receiving device 7'. The extension distance or extension length of the transport device 28' or telescopic unit(s) 52 from the unit load receiving device 7' and hence the length of the transport device 28 or telescopic unit(s) 52 extending out from the unit load receiving device 7 in the z-direction is less than 1500 mm in the embodiment illustrated.

The telescopic units 52 each have a base frame 53 and a rail 54, 55 which can be horizontally retracted and/or extended relative to the base frame 53 in one direction (z-direction). The telescopic units 52 form telescopic arms. The first rail 54 is mounted on the base frame 53 so as to be displaceable by means of a guide arrangement 56 and the second rail 55 is mounted on the first rail 54 so as to be displaceable by means of a guide arrangement 57. The first rail 54 can be moved relative to the base frame 53 with the aid of a schematically illustrated drive device 58, for example a toothed belt and rack arrangement. Alternatively, it would also be possible to use a chain and rack arrangement. The endless traction means (toothed belt or chain) is coupled with an electric drive motor 47 (schematically indicated in FIG. 8). The toothed belts for the two first rails 54 are preferably coupled with one another via a common drive shaft 59. Another option would be to provide separate drive devices 58. The telescopic unit 52 then comprises exclusively one first rail 54 and one second rail 55. The telescopic unit(s) 52, in particular the base frame 53, first rail 54 and second rail 55, have a length dimension of less than 1000 mm, for example 990 mm, in the embodiment illustrated.

The second rails 55 respectively comprise transport elements 64, 65 for transporting unit loads 6, 6-1, 6-2 between the storage channel 15 and the unit load receiving device 7'. By contrast with the embodiment described above, the inner transport elements 66 are not provided and there are exclusively outer transport elements 64, 65. The outer transport elements 64, 65 are disposed in oppositely lying end sections of the second rails 55, and each transport element 64, 65 (driver element) is coupled with an electric drive motor 67 and can be moved by the latter between an initial position and an operating position. In the initial position, the outer transport elements 64, 65 are moved out of a transport path for the unit loads 6, 6-1, 6-2 so that the unit load 6, 6-1, 6-2 is able to move past the transport elements 64, 65 and in the operating position, the transport elements 64, 65 are moved into the transport path for the unit loads 6, 6-1, 6-2 so that the respective transport elements 64, 65 positively engage behind the unit load 6, 6-1, 6-2. It would also be conceivable for the outer transport elements 64, 65 to be disposed at a distance from the oppositely lying front ends of the second rail 55 so that a length of the second rail 55 is greater than a distance between the outer transport elements 64, 65. This being the case, the unit load 6, 6-1, 6-2 can be guided by not just by the outer transport elements 64, 65 but also by the second rail 55 during the transfer movement from the unit load receiving device 7' to the intermediate position $Z_P$ (FIG. 13b) and/or final storage position $Z_{n+1}$ (FIG. 13e).

Although, based on a preferred embodiment, every second rail 55 is provided with transport elements 64, 65 co-operating in pairs, it would also be conceivable for only one of the second rails 55 to be provided with the transport elements 64, 65. Also, the transport device 28' may have only a single telescopic unit 52, although this is not illustrated.

It has also proved to be of advantage if the telescopic units 52 are also mounted on the support frame 42 so as to be displaceable relative to one another in an x-direction by means of an actuating drive (not illustrated). This being the case, a distance between the telescopic units 52 can be varied and adjusted to the respective width dimensions of the unit loads 6, 6-1, 6-2. Alternatively, the distance between the telescopic units 52 may be adjusted solely as a means of aligning (centering) a unit load 6 when it is disposed on the unit load receiving device 7'.

The drive motor 45 for the travel drive and the drive motor 47 for the actuating drive are connected to the electronic control system 48 of the unit load receiving device 7, and the electronic control system 48 is connected to the control unit 18 in order to receive travel commands, storage and/or retrieval commands and/or control signals from it.

As may also be seen in FIG. 12, the receiving platform may be formed by unit load supports 43 extending in the z-direction. If a system for adjusting the distance between the telescopic units 52 is provided, the unit load supports 43 are also mounted on the support frame 42 so as to be adjustable relative to one another in the x-direction.

If, as is the case with one possible embodiment, the unit load supports 43 respectively have a centering bar 72 extending in the z-direction, a distance between the centering bars 72 can be varied and adjusted to the respective width dimensions of the unit loads 6, 6-1, 6-2. In this manner and as an alternative to the embodiment described above, a unit load 6 can be aligned (centered) by means of the centering bars 72 when it is located on the unit load receiving device 7'.

Although not illustrated, an additional third unit load support may be provided between the unit load supports 43, which is able to provide additional support for the unit load 6, 6-1, 6-2 from underneath when it is disposed on the unit load receiving device 7', as described above.

Figure 13A:
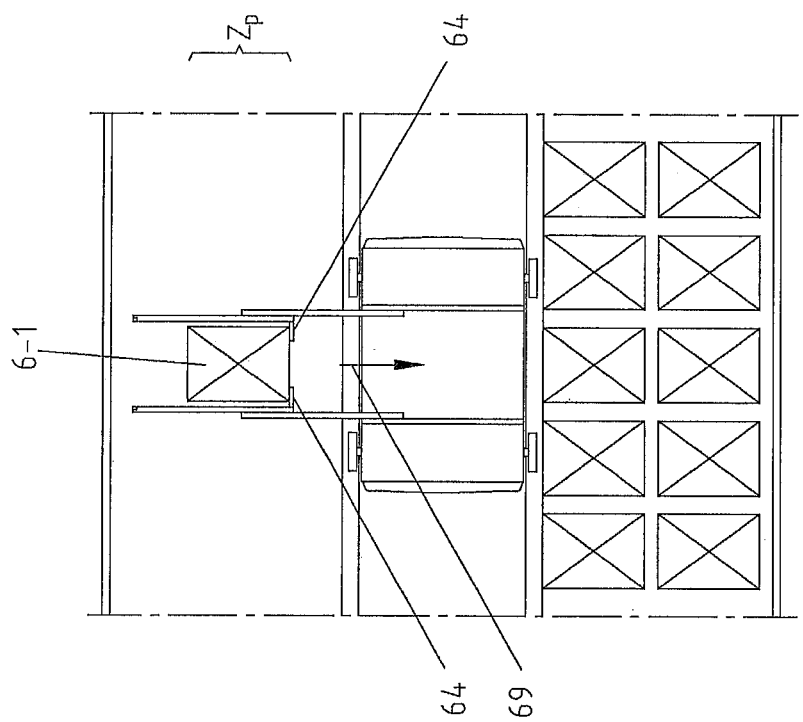
Figure 13B:
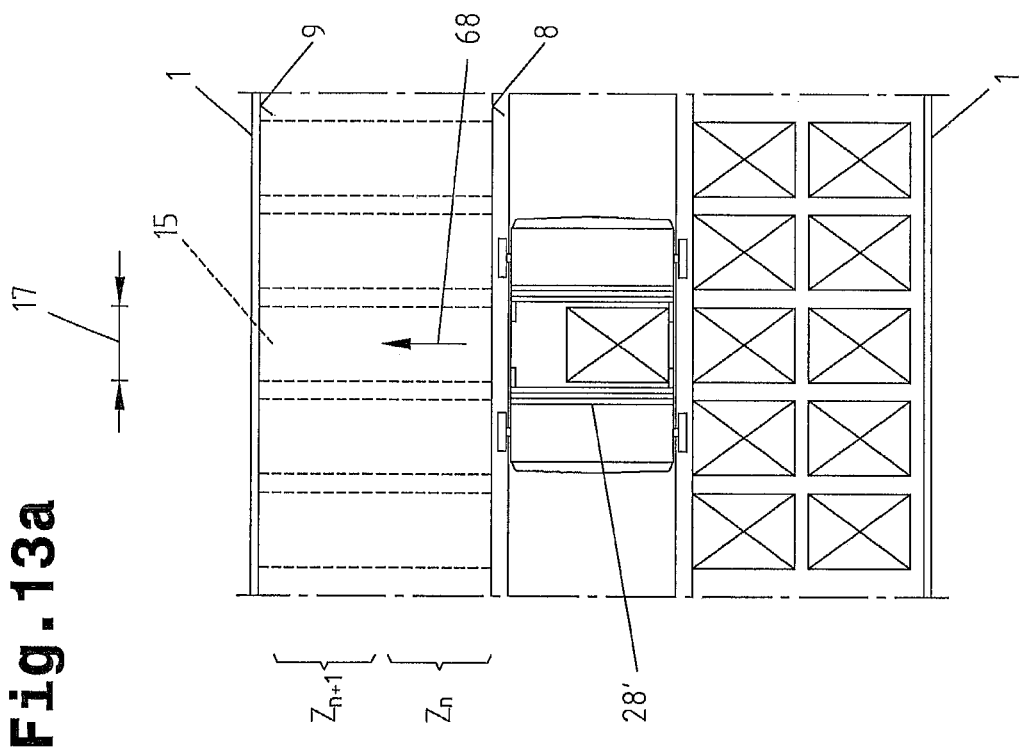
Figure 13C:
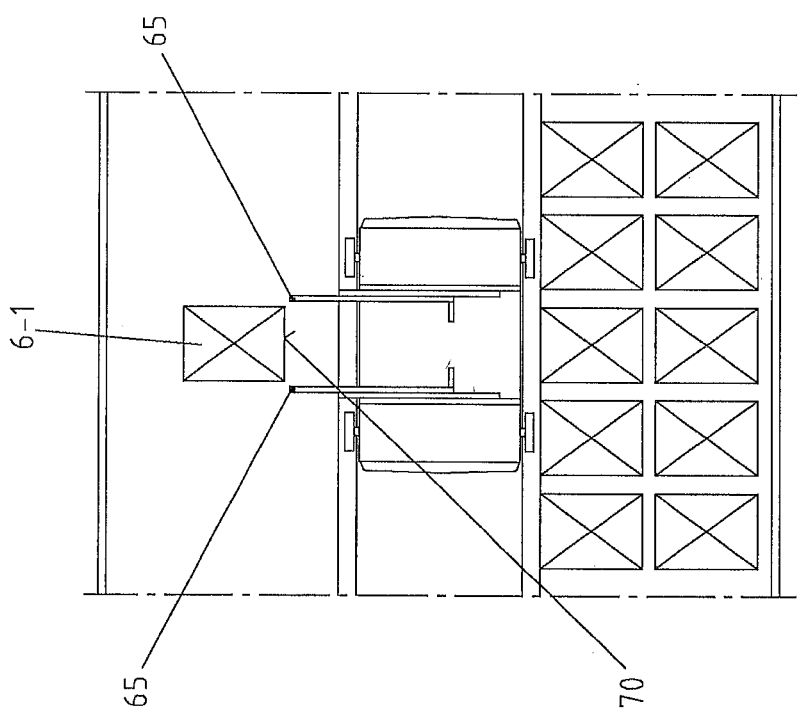
Figure 13D:
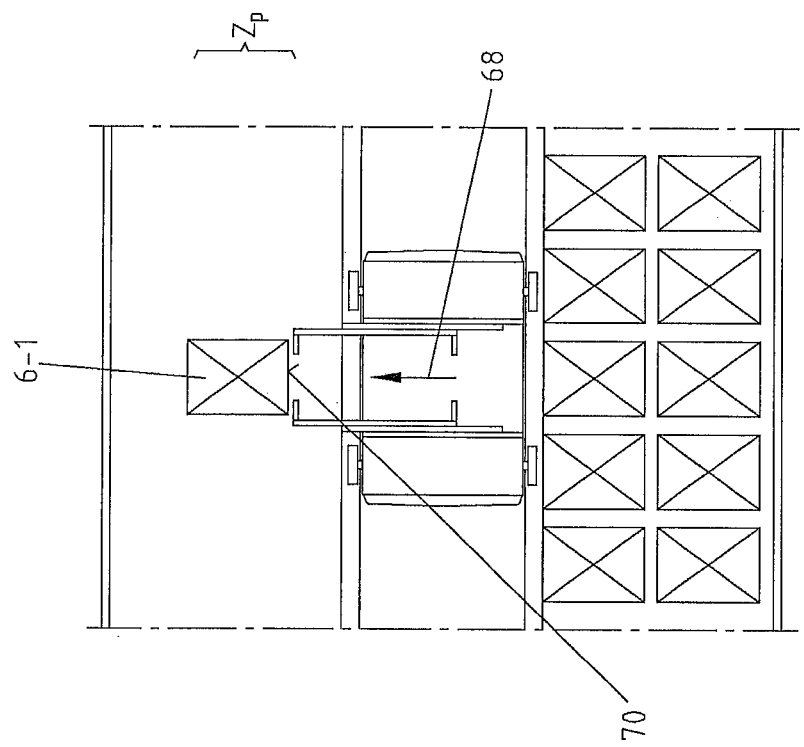
Figure 13F:
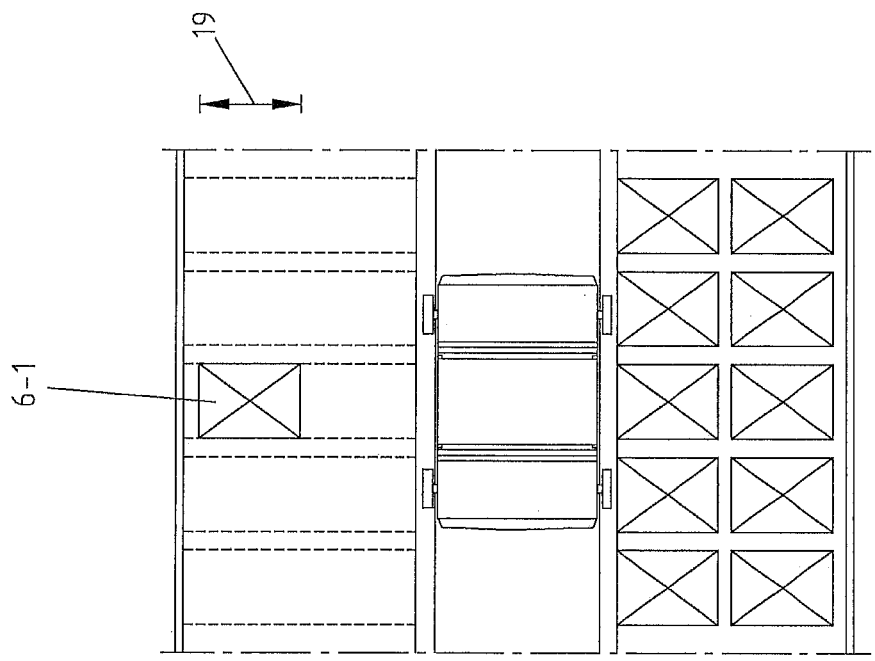
Figure 13E:
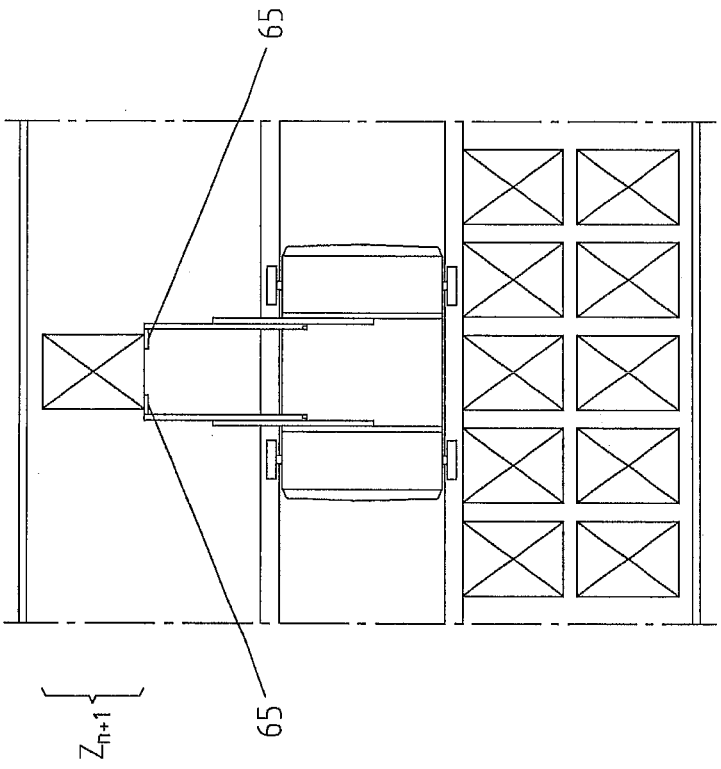
Figure 13H:
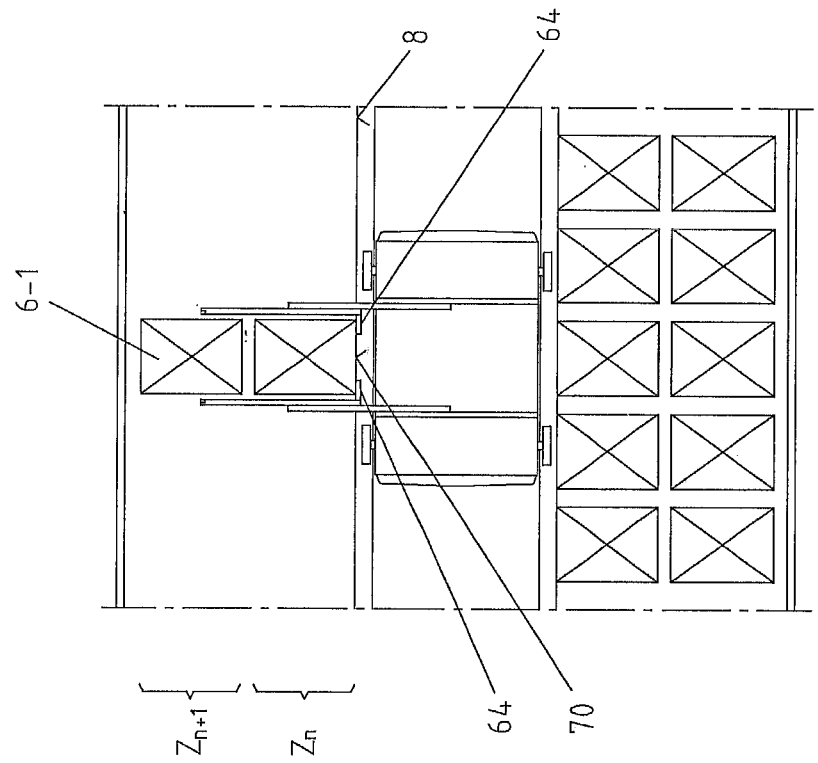
Figure 13G:
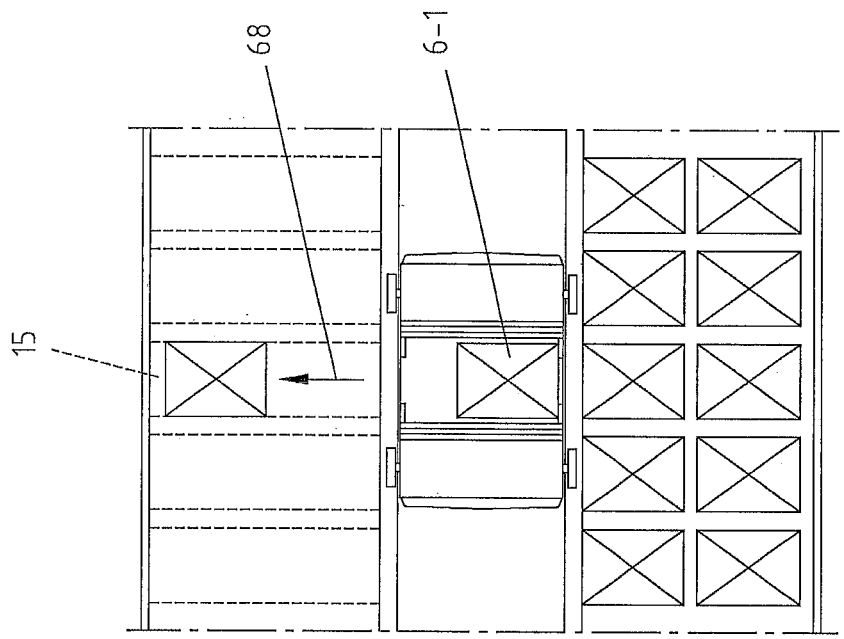

FIGS. 13*a*-13*h* illustrate the method used for transferring (storing) unit loads 6-1 respectively having a first length dimension 19 into at least one of several storage channels 15 using a sequence. To retain greater clarity, the storage channels 15 are indicated in FIGS. 13*a*, 13*f*, 13*g* only and are shown by broken lines denoting boundary lines. It goes without saying that unit loads 6-2 that are also made up of a second length dimension 20 respectively can also be transferred in the manner described below. It would naturally be possible to work with length dimensions other than those specified here. The unit load 6 may have a maximum length dimension such that it can "only just" fit between the outer transport elements 64, 65.

The storage operations are based on storage orders which are electronically detected, for example at an input device, for example a computer. The storage orders are continuously transmitted to the control unit 18, which in turn co-ordinates control of the conveyor systems 4, 5, unit load receiving device(s) 7' and transport device(s) 28'.

The control unit 18 determines for a storage order the storage channel 15 in which the unit loads 6-1 are to be stored. If the storage order is made up of more unit loads 6-1 than can be accommodated in one storage channel 15, a corresponding number of storage channels 15 in which the unit loads 6-1 will be stored one after the other is determined by the control unit 15.

The unit loads 6-1 are held in readiness on a waiting device 35. The unit load receiving device 7' collects the unit loads 6-1 from the waiting device 35 one after the other in order to then transfer them to a storage channel 15 designated by the control unit 18. This is illustrated in FIG. 2 by way of example in the rack level seventh from the bottom.

The unit load receiving device 7' transfers the first unit load 6-1 from the waiting device 35 to the receiving platform 43 and then moves in the x-direction to the designated storage channel 15 in which the first unit load 6-1 is to be stored. As may clearly be seen, the unit load receiving device 7' and receiving platform 43 are dimensioned in terms of width 22 so that a unit load 6-1 having a first length dimension 19 can be received on it. The unit load 6-1 can be received between the outer transport elements 64, 65.

FIG. 13*a* illustrates the unit load receiving device 7' after having been positioned opposite the designated storage channel 15. The first unit load 6-1 is positioned against the outer transport elements 64 which are disposed in the oppositely lying end region of the transport device 28' or second rail 55 in a first direction of adjustment (extension direction indicated by arrow 68). It is also possible for the first unit load 6-1 to be positioned by a centering stroke of the telescopic units 52 and/or a centering stroke of the centering bars 72 relative to the unit load receiving device 7' prior to the transfer movement into the storage channel 15 so that the first unit load 6-1 can be conveyed in alignment parallel with the longitudinal axis of the storage channel 15.

If the receiving platform 43 comprises a conveyor device, the first unit load 6-1 can be positioned on the unit load receiving device 7 in a direction parallel with the longitudinal extension of the storage channel 15 prior to the transfer movement into the storage channel 15, in which case the first unit load 6-1 is moved via the conveyor device opposite a storage direction and positioned against the transport elements 64 of the transport device 28' or telescopic units 52 when moved into the operating position, the transport device 28' or telescopic units 52 being located in the initial position.

As may be seen from FIG. 13*b*, the first unit load 6-1 that is to be deposited in a depth position $Z_{n+1}$ by the (first) outer transport elements 64, which are disposed in the oppositely lying end region of the transport device 28' or second rail 55 in a first direction of adjustment (extension direction of the transport device indicated by arrow 68), is moved in the storage channel 15 as far as an intermediate position $Z_P$, in particular pushed. In the intermediate position $Z_P$, the unit load 6-1 is disposed either completely in the storage channel 15 or partly on the receiving platform 43 of the unit load receiving device 7 and partly in the storage channel 15 of the storage rack 1.

The transport device 28' is then moved back in a second direction of adjustment (retraction direction of the transport device indicated by arrow 69) to the degree that the (second) outer transport elements 65 are positioned behind a side wall 70 of the unit load 6-1 facing the unit load receiving device 7', as illustrated in FIG. 13*c*.

The (second) outer transport elements 65, which are still in the initial position retracted away from the unit load 6-1 illustrated in FIG. 13*c*, are then moved into the operating position illustrated in FIG. 13*d* so that they engage behind the side wall 70.

The transport device 28' is then moved forward again in a first direction of adjustment (extension direction of the transport device indicated by arrow 68) so that the (second) outer transport elements 65 move the first unit load 6-1 in the storage channel 15 from the intermediate position $Z_P$ to the second depth position $Z_{n+1}$. This is illustrated in FIG. 13*e*.

Now that the first unit load 6-1 is in the second depth position $Z_{n+1}$ designated by the control unit 18, the transport device 28' is moved back again in a second direction of adjustment (retraction direction of the transport device indicated by arrow 69) so that it assumes the initial position, see FIG. 13*f*.

The unit load receiving device 7' then travels back to the waiting device 35 again, where optionally the second unit load 6-1 having a first length dimension 19 is already waiting in readiness. The unit load receiving device 7' now transfers the second unit load 6-1 from the waiting device 35 to the receiving platform 43 and then moves in the x-direction to the designated storage channel 15 to which the first unit load 6-1 has already been transferred for storage.

FIG. 13*g* illustrates the unit load receiving device 7', which has been positioned opposite the designated storage channel 15. The second unit load 6-1 is positioned against the outer transport elements 64, which are disposed in the oppositely lying end region of the transport device 28' or second rail 55 in the transfer direction (storage direction indicated by arrow 68). Prior to the transfer movement, the second unit load 6-1 may be aligned and/or repositioned again in the manner described above with reference to the first unit load 6-1.

The transport device 28' is then moved in a first direction of adjustment (extension direction of the transport device indicated by arrow 68) so that the outer transport elements 64 move the second unit load 6-1 from the unit load receiving device 7' or receiving platform 43 into the storage channel 15 as far as a first depth position $Z_n$, see FIG. 13*h*. The second unit load 6-1 is thus moved in the depth direction of the storage channel 15 to the degree that the side wall 70 extends substantially flush with a terminal edge of the storage channel 15 or front longitudinal face 8. The expression "substantially flush" in this context should be understood as meaning that the side wall 70 of the unit load 6-1 may be offset from the terminal edge in the direction of the storage channel 15 to the degree that there is an offset distance of less than 80 mm, for example 20 mm.

As may be seen from FIG. 13h, the first unit load 6-1 and second unit load 6-1 are deposited in the storage channel 15 in the depth positions $Z_n$, $Z_{n+1}$ at a distance from one another so that the individual unit loads 6-1 can be accessed one after the other during the retrieval operation. Such a retrieval operation is described with reference to FIGS. 10a and 10b.

When the second unit load 6-1 is disposed in the storage channel 15, the transport device 28', in particular the telescopic units 52, extended into the storage channel 15 is/are moved back into an initial position.

Finally, it should be pointed out that the unit load receiving device may also be provided in the form of a rack stacker crane and comprises a vertical mast, a bottom running gear secured to the mast base and a top running gear secured to the mast head. The bottom running gear is guided on a bottom guide rail and the top running gear is guided on a top guide rail 25. The transport device 28 in this instance is mounted on an elevator frame and its height on the vertical mast can be adjusted in the y direction by means of a lifting drive to enable the storage channels 15 in all of the rack levels to be serviced. Accordingly, the unit load receiving device is able to move in both the x-direction and the y-direction. Such a rack stacker crane is described in EP 2 419 365 B1, for example.

The embodiments illustrated as examples represent possible variants of the storage system and storage method, and it should be pointed out at this stage that the invention is not specifically limited to the variants specifically illustrated, and instead the individual variants may be used in different combinations with one another and these possible variations lie within the reach of the person skilled in this technical field given the disclosed technical teaching.

Furthermore, individual features or combinations of features from the different embodiments illustrated and described may be construed as independent inventive solutions or solutions proposed by the invention in their own right.

Above all, the individual embodiments of the subject matter illustrated in FIGS. 1 to 13 constitute independent solutions proposed by the invention in their own right.

For the sake of good order, finally, it should be pointed out that, in order to provide a clearer understanding of the structure of the storage system, it and its constituent parts are illustrated to a certain extent out of scale and/or on an enlarged scale and/or on a reduced scale.

| List of reference numbers | |
| --- | --- |
| 1 | Storage rack |
| 2 | Unit load handling device |
| 3 | Rack aisle |
| 4 | Conveyor system |
| 5 | Conveyor system |
| 6 | Unit load |
| 7 | Unit load receiving device |
| 8 | Front longitudinal face |
| 9 | Rear longitudinal face |
| 10 | Front rack post |
| 11 | Rear rack post |
| 12 | Front longitudinal member |
| 13 | Rear longitudinal member |
| 14 | Transverse member |

-continued

| List of reference numbers | |
| --- | --- |
| 15 | Storage channel |
| 16 | Storage depth |
| 17 | Storage width |
| 18 | Control unit |
| 19 | First length dimension |
| 20 | Second length dimension |
| 22 | Width |
| 27 | Travel plane |
| 28 | Transport device |
| 29 | Unit load lifting device |
| 30 | Buffer device |
| 31 | Lifting drive |
| 32 | Transport device |
| 33 | Drive motor |
| 34 | Conveyor drive |
| 35 | Waiting device |
| 36 | Waiting device |
| 37 | Conveyor drive |
| 38 | Conveyor drive |
| 39 | Unit load handling device |
| 40 | Unit load handling device |
| 41 | Waiting device |
| 42 | Support frame |
| 43 | Receiving platform |
| 44 | Wheel |
| 45 | Drive motor (travel drive) |
| 46 | Guide device |
| 47 | Drive motor (transport device) |
| 48 | Electronic control system |
| 49 | Sensor |
| 50 | Sensor |
| 51 | Contact line arrangement |
| 52 | Telescopic unit |
| 53 | Base frame |
| 54 | First rail |
| 55 | Second rail |
| 56 | Guide arrangement |
| 57 | Guide arrangement |
| 58 | Drive device |
| 59 | Drive shaft |
| 60 | First belt |
| 61 | First roller |
| 62 | Second belt |
| 63 | Second roller |
| 64 | Outer transport element |
| 65 | Outer transport element |
| 66 | Inner transport element |
| 67 | Drive motor |
| 68 | Extension direction |
| 69 | Retraction direction |
| 70 | Side wall |
| 71 | Side wall |
| 72 | Centering bar |

The invention claimed is:

1. A method for transferring unit loads to storage channels of a first storage rack and a second storage rack each having a plurality of storage channels, using a unit load handling device comprising first a buffer device with waiting devices for temporarily buffering the unit loads as long as unit load receiving devices pick up the unit loads from the waiting devices of the buffer device and second at least one unit load lifting device having a liftable transport device for transporting the unit loads from a conveyor system connected to the unit load lifting device to the waiting devices of the buffer device, wherein:
the unit load receiving devices can be moved alongside the waiting devices of the buffer device and the storage channels of the first and second storage racks in a first direction (x-direction) in order to transport unit loads between the waiting devices of the buffer device and the storage channels, each of the unit load receiving devices having a support frame,
a receiving platform configured to receive one unit load of a first length or at least one unit load of a second length,
a transport device having telescopic units, the telescopic units:
being synchronously extendable relative to the unit load receiving device into the storage channel in a second direction (z-direction), and
disposed parallel with longitudinal sides of the receiving platform, and
each telescopic unit having a base frame, a first rail that is displaceable relative to the base frame and a second rail that is displaceable relative to the first rail, wherein the second rails each is provided with an outer transport element respectively at its oppositely lying end sections and one inner transport element disposed between them, wherein the outer and inner transport elements are used to transfer the unit loads to depth positions lying one behind the other in the storage channels with a mutual spacing, and wherein the outer and inner transport elements can be moved between an initial position retracted away from the unit load and an operating position engaging with the unit load, and
each of the unit load receiving devices is able to receive the one unit load of the first length exclusively between the outer transport elements or at least one unit load of the second length between one of the outer transport elements and the inner transport elements,
comprising the steps:
transferring a unit load of the first length or at least one unit load of a second length to the unit load receiving device,
positioning the unit load receiving device in front of a storage channel designated by a controller in which a unit load is to be stored at least in a first depth position and a unit load is to be stored in a second depth position lying behind the first depth position,
initially shifting a unit load from the unit load receiving device into the storage channel such that this unit load is shifted by a first pair of outer or inner transport elements by moving the transport device in the direction of the storage channel as far as an intermediate position,
moving back the transport device in the direction of the unit load receiving device such that a second pair of outer or inner transport elements that will be used to shift the unit load from the intermediate position to the second depth position is positioned behind a side wall of the unit load facing the unit load receiving device,
finally shifting the unit load in the storage channel from the intermediate position to the second depth position using the second pair of outer or inner transport elements by moving the transport device in the direction of the storage channel.

2. The method according to claim 1, comprising the steps:
transferring a first unit load of the first length to the unit load receiving device,
positioning the unit load receiving device in front of a storage channel designated by a controller in which a unit load of the first length is to be stored at least in a first depth position and a unit load of the first length is to be stored in a second depth position lying behind the first depth position,
initially shifting the unit load from the unit load receiving device into the storage channel such that this unit load is shifted by the outer transport elements of the first pair of outer or inner transport elements lying in rear end sections of the end sections in the direction of adjustment by moving the transport device in the direction of the storage channel as far as the intermediate position,
moving back the transport device in the direction of the unit load receiving device such that the inner transport elements of the second pair of outer or inner transport elements are positioned behind a side wall of the unit load facing the unit load receiving device,
finally shifting the unit load in the storage channel from the intermediate position to the second depth position using the inner transport element by moving the transport device in the direction of the storage channel.

3. The method according to claim 2, comprising the steps:
transferring a second unit load of the first length to the unit load receiving device,
positioning the unit load receiving device in front of the designated storage channel in which the first unit load of the first length has already been transferred to the second depth position,
shifting the second unit load from the unit load receiving device into the storage channel to the first depth position using the outer transport elements lying in rear end sections of the end sections in the direction of adjustment by moving the transport device in the direction of the storage channel.

4. The method according to claim 1, comprising the steps:
transferring a first unit load of the second length to the unit load receiving device,
positioning the unit load receiving device in front of a storage channel designated by a controller in which at least a unit load of the second length is to be stored in a first depth position and a unit load of the second length is to be stored in a second depth position and a unit load of the second length is to be stored in a third depth position lying behind it,
initially shifting the unit load from the unit load receiving device into the storage channel such that this unit load is shifted by the inner transport elements of the first pair of outer or inner transport elements by moving the transport device in the direction of the storage channel as far as the intermediate position,
moving back the transport device in the direction of the unit load receiving device such that the outer transport elements of the second pair of outer or inner transport elements lying in rear end sections of the end sections in the direction of adjustment are positioned behind a side wall of the unit load facing the unit load receiving device,
finally shifting the unit load in the storage channel from the intermediate position to the third depth position using the outer transport elements of the second pair of outer or inner transport elements lying in front end sections of the end sections in the direction of adjustment by moving the transport device in the direction of the storage channel.

5. The method according to claim 4, comprising the steps:
transferring a second unit load of the second length to the unit load receiving device, positioning the unit load receiving device in front of the designated storage channel in which the first unit load of the second length has already been transferred to the third depth position, shifting the second unit load from the unit load receiving device in the storage channel to the second depth position using the outer transport element of the first pair of outer or inner transport elements lying in rear end sections of the end sections in the direction of adjustment or by means of using the middle transport element by moving the transport device in the direction of the storage channel, and then transferring a third unit load of the second length to the unit load receiving device, positioning the unit load receiving device in front of the designated storage channel in which the first unit load of the second length has already been transferred to the third depth position and the second unit load of the second length has already been transferred to the second depth position, shifting the third unit load from the unit load receiving device in the storage channel to the first depth position using the outer transport element of the first pair of outer or inner transport elements lying in rear end sections of the end sections in the direction of adjustment or using the middle transport element by moving the transport device in the direction of the storage channel.

6. A storage system comprises
a first storage rack having storage channels disposed adjacent to one another in rack levels lying one above the other,
a second storage rack having storage channels disposed adjacent to one another in rack levels lying one above the other,
a rack aisle which extends in a first direction (x-direction) between the first storage rack and the second storage rack,
a plurality of unit load receiving devices, each of the unit load receiving devices having
 a support frame,
 a receiving platform being configured to receive one unit load of a first length or at least one unit load of a second length,
 a transport device having telescopic units, the telescopic units:
  being synchronously extendable relative to the unit load receiving device into the storage channel in a second direction (z-direction), and
  disposed parallel with longitudinal sides of the receiving platform, and
 each telescopic unit having a base frame, a first rail that is displaceable relative to the base frame and a second rail that is displaceable relative to the first rail, wherein the second rails each is provided with an outer transport element respectively at its oppositely lying end sections and one inner transport element disposed between them, wherein the outer and inner transport elements being used to transfer the unit loads to depth positions lying one behind the other in the storage channels with a mutual spacing, and wherein the outer and inner transport elements can be moved between an initial position retracted away from the unit load and an operating position engaging with the unit load, and
each of the unit load receiving devices is able to receive the one unit load of the first length exclusively between the outer transport elements or at least one unit load of the second length between one of the outer transport elements and the inner transport elements,
a unit load handling device comprising first a buffer device with waiting devices for temporarily buffering the unit loads and second at least one unit load lifting device having a liftable transport device for transporting the unit loads from a conveyor system to the waiting devices of the buffer device, and
guide rails which are disposed in at least some of the rack levels between the first storage rack and second storage rack in such a way that the unit load receiving devices are able to move alongside the waiting devices and storage channels in order to transport unit loads between the waiting devices and the storage channels,
a conveyor system connected to the unit load lifting device for conveying unit loads to the unit load lifting device,
a controller activates the unit load receiving devices and transport devices, and is configured in order to implement the following method steps:
transferring a unit load of the first length or at least one unit load of a second length to the unit load receiving device,
positioning the unit load receiving device in front of a storage channel designated by the controller in which a unit load is to be stored at least in a first depth position and a unit load is to be stored in a second depth position lying behind the first depth position,
initially shifting a unit load from the unit load receiving device into the storage channel such that this unit load is shifted by a first pair of the outer or inner transport elements by moving the transport device in the direction of the storage channel as far as an intermediate position,
moving back the transport device in the direction of the unit load receiving device such that a second pair of the outer or inner transport elements that will be used to shift the unit load from the intermediate position to the second depth position is positioned behind a side wall of the unit load facing the unit load receiving device,
finally shifting the unit load in the storage channel from the intermediate position to the second depth position using the second pair of the outer or inner transport elements by moving the transport device in the direction of the storage.

7. The storage system according to claim 6, wherein the second rails each is provided with the outer transport element respectively at its oppositely lying end sections and the one inner transport element disposed centrally between the outer transport elements.

8. The storage system according to claim 6, wherein the unit load receiving device is a single-level storage and retrieval unit.

9. A method for transferring unit loads to storage channels of a first storage rack and a second storage rack each having a plurality of storage channels, using a unit load handling device comprising first a buffer device with waiting devices for temporarily buffering the unit loads as long as unit load receiving devices pick up the unit loads from the waiting devices of the buffer device and second at least one unit load lifting device having a liftable transport device for transporting the unit loads from a conveyor system connected to the unit load lifting device to the waiting devices of the buffer device, wherein:
 the unit load receiving devices can be moved alongside the waiting devices of the buffer device and the storage channels of the first and second storage racks in a first direction (x-direction) in order to transport unit loads between the waiting devices of the buffer device and the storage channels, each of the unit load receiving devices having a support frame, a receiving platform being configured to receive a unit load, a transport device having telescopic units, the telescopic units:

being synchronously extendable relative to the unit load receiving device into the storage channel of one of the first and second storage racks in a second direction (z-direction), and disposed parallel on the support frame, and each telescopic unit having a base frame, a first rail that is displaceable relative to the base frame and a second rail that is displaceable relative to the first rail, wherein the second rails each is provided with an outer transport element respectively at its oppositely lying end sections, wherein the outer transport elements being used to transfer the unit loads to depth positions Iyinq one behind the other in the storage channels with a mutual spacing, and wherein the outer transport elements can be moved between an initial position retracted away from the unit load and an operating position engaging with the unit load, and each of the unit load receiving devices is able to receive the unit load between the outer transport elements, comprising the steps:

transferring a unit load to the unit load receiving device, positioning the unit load receiving device in front of a storage channel designated by a controller in which a unit load is to be stored at least in a first depth position and a unit load is to be stored in a second depth position lying behind the first depth position, initially shifting a unit load from the unit load receiving device into the storage channel such that this unit load is shifted by a first pair of outer transport elements by moving the transport device in the direction of the storage channel up to an intermediate position, moving back the transport device in the direction of the unit load receiving device such that a second pair of the outer transport elements that will be used to shift the unit load from the intermediate position to the second depth position is positioned behind a side wall of the unit load facing the unit load receiving device, finally shifting the unit load in the storage channel from the intermediate position to the second depth position using the second pair of the outer transport elements by moving the transport device in the direction of the storage channel.

10. The method according to claim 9, wherein the unit load is aligned on the unit load receiving device and in a direction extending transversely to the longitudinal extension of the storage channel prior to being shifted from the unit load receiving device into the storage channel.

11. The method according to claim 9, wherein the unit load is positioned on the unit load receiving device and in a direction parallel with the longitudinal extension of the storage channel prior to being shifted from the unit load receiving device into the storage channel.

12. A storage system comprises a first storage rack having storage channels disposed adjacent to one another in rack levels lying one above the other, a second storage rack having storage channels disposed adjacent to one another in rack levels lying one above the other, a rack aisle which extends in a first direction (x-direction) between the first storage rack and the second storage rack, a plurality of unit load receiving devices, each of the unit load receiving devices having a support frame, a receiving platform being configured to receive a unit load, a transport device having telescopic units, the telescopic units:

being synchronously extendable relative to the unit load receiving device into the storage channel of one of the first and second storage racks in a second direction (z-direction), and disposed parallel on the support frame, and each telescopic unit having a base frame, a first rail that is displaceable relative to the base frame and a second rail that is displaceable relative to the first rail, wherein the second rails each is provided with an outer transport element respectively at its oppositely lying end sections, wherein the outer transport elements being used to transfer the unit loads to depth positions lying one behind the other in the storage channels with a mutual spacing, and wherein the outer transport elements can be moved between an initial position retracted away from the unit load and an operating position engaging with the unit load, and each of the unit load receiving devices is able to receive the unit load between the outer transport elements, a unit load handling device comprising first a buffer device with waiting devices for temporarily buffering the unit loads and second at least one unit load lifting device having a liftable transport device for transporting the unit loads from a conveyor system to the waiting devices of the buffer device, and guide rails which are disposed in at least some of the rack levels between the first storage rack and second storage rack in such a way that the unit load receiving devices are able to move alongside the waiting devices and storage channels in order to transport unit loads between the waiting devices and the storage channels, a conveyor system connected to the unit load lifting device for conveying unit loads to the unit load lifting device, a controller activates the unit load receiving devices and transport devices, and is configured in order to implement the following methods steps:

transferring a unit load to the unit load receiving device, positioning the unit load receiving device in front of a storage channel designated by a the controller in which a unit load is to be stored at least in a first depth position and a unit load is to be stored in a second depth position lying behind the first depth position, initially shifting a unit load from the unit load receiving device into the storage channel such that this unit load is shifted by a first pair of the outer transport elements by moving the transport device in the direction of the storage channel up to an intermediate position, moving back the transport device in the direction of the unit load receiving device such that a second pair of the outer transport elements that will be used to shift the unit load from the intermediate position to the second depth position is positioned behind a side wall of the unit load facing the unit load receiving device, finally shifting the unit load in the storage channel from the intermediate position to the second depth position using the second pair of the outer transport elements by moving the transport device in the direction of the storage channel.

\* \* \* \* \*